United States Patent
Acuna Cespedes et al.

(10) Patent No.: US 12,442,294 B2
(45) Date of Patent: Oct. 14, 2025

(54) PRODUCTION OF LOW PERMEABILITY GEOTHERMAL RESOURCES

(71) Applicant: Chevron U.S.A. Inc., San Ramon, CA (US)

(72) Inventors: Jorge Arturo Acuna Cespedes, Katy, TX (US); Anil Kumar Ambastha, Houston, TX (US); Carla Kathryn Dee Co, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 374 days.

(21) Appl. No.: 17/943,978

(22) Filed: Sep. 13, 2022

(65) Prior Publication Data

US 2023/0083056 A1    Mar. 16, 2023

Related U.S. Application Data

(60) Provisional application No. 63/244,195, filed on Sep. 14, 2021.

(51) Int. Cl.
*E21B 49/08*    (2006.01)

(52) U.S. Cl.
CPC .............................. *E21B 49/0875* (2020.05)

(58) Field of Classification Search
CPC ....... E21B 49/0875; F24T 10/10; F24T 50/00; F24T 2010/56; F24T 10/20; F24T 10/30; Y02E 10/10
See application file for complete search history.

(56) References Cited

U.S. PATENT DOCUMENTS

| | | | |
|---|---|---|---|
| 3,786,858 A | 1/1974 | Potter et al. | |
| 3,817,038 A | 6/1974 | Paull et al. | |
| 3,957,108 A * | 5/1976 | Van Huisen | F03G 4/074 |
| | | | 165/45 |

(Continued)

FOREIGN PATENT DOCUMENTS

| | | | | |
|---|---|---|---|---|
| CA | 1115155 A | * | 12/1981 | |
| WO | WO-2009105605 A1 | * | 8/2009 | F01K 23/04 |

OTHER PUBLICATIONS

Brown et al. "Fluid circulation and heat extraction from engineered geothermal reservoirs," Geothermics 28 (1999) pp. 553-572 (Year: 1999).*

(Continued)

*Primary Examiner* — John Fitzgerald
(74) *Attorney, Agent, or Firm* — Smith & Woldesenbet Law Group, PLLC

(57) ABSTRACT

A method for collecting a heated fluid from a fractured subterranean formation can include removing a fluid having a liquid phase from the fractured subterranean formation through a wellbore that is in fluidic communication with the fractured subterranean formation. The method can also include collecting from the wellbore the heated fluid having a vapor phase that is expelled from a low permeability rock matrix of the fractured subterranean formation. The method can also optionally include injecting an injection fluid having the liquid phase into the low permeability rock matrix of the fractured subterranean formation through the wellbore when a parameter falls outside a range of acceptable values.

20 Claims, 12 Drawing Sheets

(56) References Cited

U.S. PATENT DOCUMENTS

| | | | | |
|---|---|---|---|---|
| 3,975,912 A * | 8/1976 | Greene | ................... | F03G 4/074 |
| | | | | 165/45 |
| 4,044,830 A * | 8/1977 | Van Huisen | ............ | F24T 10/20 |
| | | | | 165/45 |
| 4,051,677 A * | 10/1977 | Van Huisen | ............ | F24T 10/30 |
| | | | | 165/45 |
| 4,054,176 A * | 10/1977 | Van Huisen | ............ | F03G 4/074 |
| | | | | 165/45 |
| 4,074,754 A | 2/1978 | Christian | | |
| 4,137,720 A * | 2/1979 | Rex | ......................... | F24T 10/20 |
| | | | | 299/5 |
| 4,200,152 A * | 4/1980 | Foster | ................... | E21B 43/283 |
| | | | | 166/308.1 |
| 4,223,729 A * | 9/1980 | Foster | ..................... | E21B 43/17 |
| | | | | 166/250.1 |
| 5,685,362 A * | 11/1997 | Brown | ..................... | F24T 10/20 |
| | | | | 165/45 |
| 6,247,313 B1 * | 6/2001 | Moe | ....................... | E21B 43/305 |
| | | | | 60/641.5 |
| 6,668,554 B1 * | 12/2003 | Brown | ..................... | F24T 10/20 |
| | | | | 60/641.2 |
| 7,753,122 B2 | 7/2010 | Curlett | | |
| 8,430,166 B2 | 4/2013 | Danko | | |
| 8,616,000 B2 | 12/2013 | Parrella | | |
| 8,650,875 B2 | 2/2014 | Wiggs et al. | | |
| 8,820,075 B2 * | 9/2014 | Kaminsky | ................. | F03G 7/04 |
| | | | | 60/641.2 |
| 8,881,805 B2 | 11/2014 | Klemencic | | |
| 9,085,972 B1 * | 7/2015 | Hill | ....................... | E21B 43/241 |
| 9,784,090 B2 | 10/2017 | Baria et al. | | |
| 10,196,884 B2 * | 2/2019 | Li | ............................ | E21B 43/20 |
| 10,401,056 B2 | 9/2019 | Song et al. | | |
| 10,527,026 B2 * | 1/2020 | Muir | ......................... | F03G 7/04 |
| 10,551,091 B2 | 2/2020 | Kruger | | |
| 11,959,666 B2 * | 4/2024 | Fleckenstein | ........... | F24T 10/20 |
| 2010/0288466 A1 | 11/2010 | Danko | | |
| 2010/0307756 A1 | 12/2010 | Jung et al. | | |
| 2011/0041500 A1 | 2/2011 | Riley | | |
| 2011/0061382 A1 | 3/2011 | Stern | | |
| 2012/0018120 A1 * | 1/2012 | Danko | ................... | F24T 10/20 |
| | | | | 165/45 |
| 2012/0193106 A1 * | 8/2012 | Schultz | ................... | F16L 27/12 |
| | | | | 166/242.6 |
| 2012/0198844 A1 | 8/2012 | Kaminsky | | |
| 2012/0199354 A1 | 8/2012 | Kaminsky | | |
| 2014/0224491 A1 | 8/2014 | Segerstrom | | |
| 2014/0238672 A1 * | 8/2014 | Buscheck | ............... | E21B 43/16 |
| | | | | 166/268 |
| 2015/0354859 A1 | 12/2015 | Marsh et al. | | |
| 2017/0211849 A1 | 7/2017 | Muir et al. | | |
| 2019/0055930 A1 * | 2/2019 | Muir | ......................... | F03G 7/04 |
| 2020/0011573 A1 | 1/2020 | Graham et al. | | |
| 2020/0049380 A1 | 2/2020 | Cairns et al. | | |
| 2020/0190937 A1 | 6/2020 | Nevison et al. | | |
| 2020/0191444 A1 | 6/2020 | Nevison et al. | | |
| 2020/0217181 A1 | 7/2020 | Norbeck et al. | | |
| 2021/0025623 A1 | 1/2021 | Holtzman | | |
| 2021/0131745 A1 | 5/2021 | Sharma et al. | | |
| 2022/0349286 A1 * | 11/2022 | Bowdon | ............... | E21B 43/121 |
| 2023/0076219 A1 * | 3/2023 | Fleckenstein | ........... | F24T 50/00 |
| 2023/0408151 A1 * | 12/2023 | Norbeck | ................. | F03G 4/072 |
| 2024/0035710 A1 * | 2/2024 | Toews | ................... | E21B 43/305 |
| 2024/0255189 A1 * | 8/2024 | Fleckenstein | ........... | F03G 4/023 |

OTHER PUBLICATIONS

M.R. Safari and A. Ghassemi, 3D Analysis of Huff and Puff and Injection Tests in Geothermal Reservoirs, Proceedings, Thirty-Sixth Workshop on Geothermal Reservoir Engineering Stanford University, Stanford, California, Jan. 31-Feb. 2, 2011, 10 pages.

Dr. Gabriela Von Goerne, GeneSys Hannover (Geothermal Well GroB Buchholz Gt1), BGR Bundesanstalt fur Geowissenschaften und Rohstoffe, https://www.bgr.bund.de/EN/Themen/Nutzung_tieferer_Untergrund_CO2Speicherung/Projekte/Geothermie/Laufend/GeneSys_Projekt.html?nn=1548118, Jan. 3, 2018, 2 pages.

Dr. Torsten Tischner and Dr. Wolfram Ruhaak, Geothermal Well Horstberg, BGR Bundesanstalt fur Geowissenschaften und Rohstoffe, https://www.bgr.bund.de/EN/Themen/Nutzung_tieferer_Untergrund_CO2Speicherung/Projekte/Geothermie/Abgeschlossen/Horstberg_Projekt.html?nn=1548106, Jan. 3, 2018, 2 pages.

Jens Orzol, Reinhard Jung, Reiner Jatho, Torsten Tischner, and Peter Kehrer, The GeneSys-Project: Extraction of Geothermal Heat from Tight Sediments, Proceedings World Geothermal Congress 2005, Antalya, Turkey, Apr. 24-29, 2005, 9 pages.

Torsten Tischner, Hermann Evers, Holger Hauswirth, Reiner Jatho, Michael Kosinowski, and Hans Sulzbacher, New Concepts for Extracting Geothermal Energy from One Well: The GeneSys-Project, Proceedings World Geothermal Congress 2010, Bali, Indonesia, Apr. 25-29, 2010, 5 pages.

Kari Rodriquez, PCT International Search Report, Sep. 7, 2022, 4 pages, US as receiving office.

Kari Rodriquez, Written Opinion of the International Search Authority, Sep. 7, 2022, 8 pages, US as receiving office.

* cited by examiner

PRODUCTION OF LOW PERMEABILITY GEOTHERMAL RESOURCES

CROSS-REFERENCE TO RELATED APPLICATIONS

This application claims priority to U.S. Provisional Patent Application Ser. No. 63/244,195 titled "Production of Low Permeability Geothermal Resources" and filed on Sep. 14, 2021, the entire contents of which are hereby incorporated herein by reference.

TECHNICAL FIELD

The present application is related to geothermal resources and, more particularly, to production of low permeability geothermal resources.

BACKGROUND

One source of energy is the natural heat of the earth. A number of attempts have been made to recover heat from geothermal formations of the earth. There is a continued desire to produce geothermal formations.

SUMMARY

In general, in one aspect, the disclosure relates to a method for collecting a heated fluid from a fractured subterranean formation. The method can include removing a fluid having a liquid phase from the fractured subterranean formation through a wellbore that is in fluidic communication with the fractured subterranean formation. The method can also include collecting from the wellbore the heated fluid having a vapor phase that is expelled from a low permeability rock matrix of the fractured subterranean formation. Optionally, the method can further include injecting an injection fluid having the liquid phase into the low permeability rock matrix of the fractured subterranean formation through the wellbore when a parameter falls outside a range of acceptable values.

In another aspect, the disclosure relates to a method for recovering thermal energy from a fractured subterranean formation. The method can include removing a fluid having a liquid phase from the fractured subterranean formation through a wellbore that is in fluidic communication with the fractured subterranean formation to reduce a downhole pressure in the wellbore. The method can also include recovering through the wellbore, after removing the fluid having the liquid phase, the thermal energy from heated fluid having a vapor phase that is expelled from a low permeability rock matrix of the fractured subterranean formation.

In yet another aspect, the disclosure relates to a system for collecting a heated fluid from a fractured subterranean formation. The system can include a fluid removal system that removes a fluid having a liquid phase of the fractured subterranean formation through a wellbore that is in fluidic communication with the fractured subterranean formation. The system can also include a heated fluid collection system that collects from the wellbore the heated fluid having a vapor phase that is expelled from a low permeability rock matrix of the fractured subterranean formation. The system can further include a fluid injection system that optionally injects an injection fluid having the liquid phase into the low permeability rock matrix of the fractured subterranean formation through the wellbore when a parameter falls outside a range of acceptable values. The system can also include a measurement system that measures the parameter.

In still another aspect, the disclosure relates to a system for recovering thermal energy from a fractured subterranean formation. The system can include a fluid removal system configured to remove a fluid having the liquid phase from the fractured subterranean formation through a wellbore that is in fluidic communication with the fractured subterranean formation to reduce a downhole pressure in the wellbore. The system can also include a heated fluid collection system configured to recover through the wellbore, after removing the fluid having the liquid phase, the thermal energy from heated fluid having a vapor phase that is expelled from a low permeability rock matrix of the fractured subterranean formation.

In yet another aspect, the disclosure relates to a method for collecting a heated fluid from a fractured subterranean formation. The method can include generating a reservoir volume within a subterranean formation by inducing fractures that emanate from a wellbore into a low permeability rock matrix of the subterranean formation, where the reservoir volume has a high conductivity. The method can also include reducing a pressure within the reservoir volume by removing a fluid having a liquid phase through the wellbore, where the fluid having the liquid phase within the low permeability rock matrix in the reservoir volume transitions or boils into the low permeability rock matrix to produce the heated fluid comprising a vapor phase. The method can further include collecting from the wellbore the heated fluid comprising the vapor phase that is expelled from the low permeability rock matrix and flows through fractures in the fractured subterranean formation toward the wellbore.

In still another aspect, the disclosure relates to a non-transitory computer readable medium (CRM) that includes computer readable program code, which when executed by a computer processor, enables the computer processor to obtain a plurality of data from a plurality of measurement devices, where the plurality of data includes measurements of parameters associated with a subterranean formation. The computer processor can also be enabled to evaluate, using the plurality of data and a plurality of algorithms, a plurality of characteristics of the subterranean formation. The computer processor can further be enabled to identify, based on evaluating the plurality of characteristics, a geothermal resource within a volume of the subterranean formation, where the volume has a permeability that falls within a first range of acceptable values and a porosity that falls within a second range of acceptable values.

In yet another aspect, the disclosure relates to a non-transitory computer readable medium (CRM) having computer readable program code, which when executed by a computer processor, enables the computer processor to obtain a plurality of data from a plurality of measurement devices, where the plurality of data includes measurements associated with a wellbore drilled through a low permeability rock matrix within a volume of a subterranean formation. The computer processor can also be enabled to evaluate, using the plurality of data and a plurality of algorithms, a plurality of characteristics of the low permeability rock matrix within the volume. The computer processor can further be enabled to identify, based on evaluating the plurality of characteristics, operating parameters for a multi-segment process for collecting a heated fluid expelled from the low permeability rock matrix to the wellbore.

In still another aspect, the disclosure relates to a method for identifying a low permeability geothermal resource within a subterranean formation. The method can include obtaining a plurality of data from a plurality of measurement devices, where the plurality of data includes measurements of parameters associated with a subterranean formation. The method can also include evaluating, using the plurality of data and a plurality of algorithms, a plurality of characteristics of the subterranean formation. The method can further include identifying, based on evaluating the plurality of characteristics, a geothermal resource within a volume of the subterranean formation, where the volume has a permeability that falls within a first range of acceptable values and a porosity that falls within a second range of acceptable values.

In yet another aspect, the disclosure relates to a method for operating the production of a low permeability geothermal resource. The method can include obtaining a plurality of data from a plurality of measurement devices, where the plurality of data includes measurements associated with a wellbore drilled through a low permeability rock matrix within a volume of a subterranean formation. The method can also include evaluating, using the plurality of data and a plurality of algorithms, a plurality of characteristics of the low permeability rock matrix within the volume. The method can further include identifying, based on evaluating the plurality of characteristics, operating parameters for a multi-segment process for collecting a heated fluid expelled from the low permeability rock matrix to the wellbore.

In still another aspect, the disclosure relates to a system for identifying a low permeability geothermal resource within a subterranean formation. The system can include a controller that is configured to obtain, by an obtaining component of the controller, a plurality of data from a plurality of measurement devices, where the plurality of data includes measurements of parameters associated with a subterranean formation. The controller can also be configured to evaluate, by an evaluation component of the controller and using the plurality of data and a plurality of algorithms, a plurality of characteristics of the subterranean formation. The controller can further be configured to identify, using an identification component of the controller and based on evaluating the plurality of characteristics, a geothermal resource within a volume of the subterranean formation, where the volume has a permeability that falls within a first range of acceptable values and a porosity that falls within a second range of acceptable values.

In yet another aspect, the disclosure relates to a system for operating the production of a low permeability geothermal resource. The system can include a controller that is configured to obtain, by an obtaining component of the controller, a plurality of data from a plurality of measurement devices, where the plurality of data includes measurements associated with a wellbore drilled through a low permeability rock matrix within a volume of a subterranean formation. The controller can also be configured to evaluate, by an evaluation component of the controller and using the plurality of data and a plurality of algorithms, a plurality of characteristics of the low permeability rock matrix within the volume. The controller can further be configured to identify, using an identification component of the controller and based on evaluating the plurality of characteristics, operating parameters for a multi-segment process for collecting a heated fluid expelled from the low permeability rock matrix to the wellbore.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DESCRIPTION OF THE INVENTION

Figure 1A:
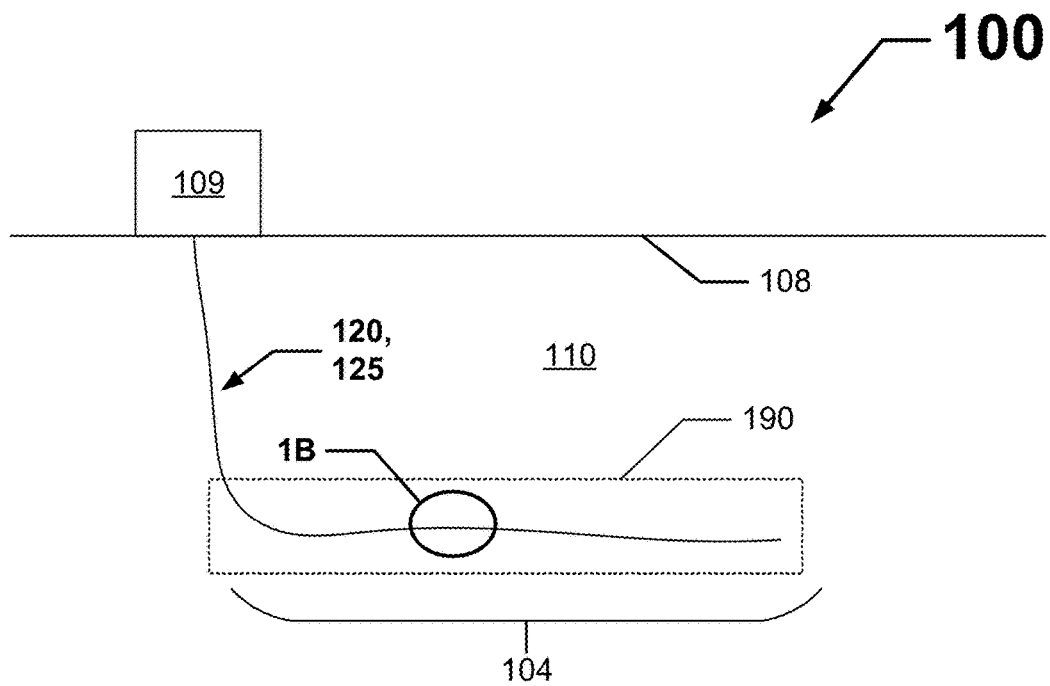
FIGS. 1A and 1B show various views of a field system for producing low permeability geothermal resources according to certain example embodiments.

The example embodiments discussed herein are directed to systems, apparatus, methods, and devices for production of low permeability geothermal resources. The steam captured using example embodiments can be used for any of a number of purposes, including but not limited to power generation, industrial processes (e.g., drying, distillation, steam cracking), and heating processes. A user as defined herein can be any person or entity involved in a field operation related to production of low permeability geothermal resources. Examples of a user can include, but are not limited to, an engineer, a mechanic, an operator, a company representative, a control system, an electric generator, and a consultant.

Creating one or more wellbores with induced fractures and/or using such wellbores with example embodiments can be designed to comply with certain standards and/or requirements. Examples of entities that set such standards and/or requirements can include, but are not limited to, the Society of Petroleum Engineers, the American Petroleum Institute (API), the International Standards Organization (ISO), and the Occupational Safety and Health Administration (OSHA).

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of production of low permeability geothermal resources will be described more fully hereinafter with reference to the accompanying drawings, in which example embodiments of production of low permeability geothermal resources are shown. Production of low permeability geothermal resources may, however, be embodied in many different forms and should not be construed as limited to the example embodiments set forth herein. Rather, these example embodiments are provided so that this disclosure will be thorough and complete, and will fully convey the scope of production of low permeability geothermal resources to those of ordinary skill in the art. Like, but not necessarily the same, elements (also sometimes called components) in the various figures are denoted by like reference numerals for consistency.

Terms such as "first", "second", "outer", "inner", "top", "bottom", "above", "below", "distal", "proximal", "front,", "rear," "left," "right," "on", and "within" are used merely to distinguish one component (or part of a component or state of a component) from another. This list of terms is not exclusive. Such terms are not meant to denote a preference or a particular orientation, and they are not meant to limit embodiments of production of low permeability geothermal resources. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
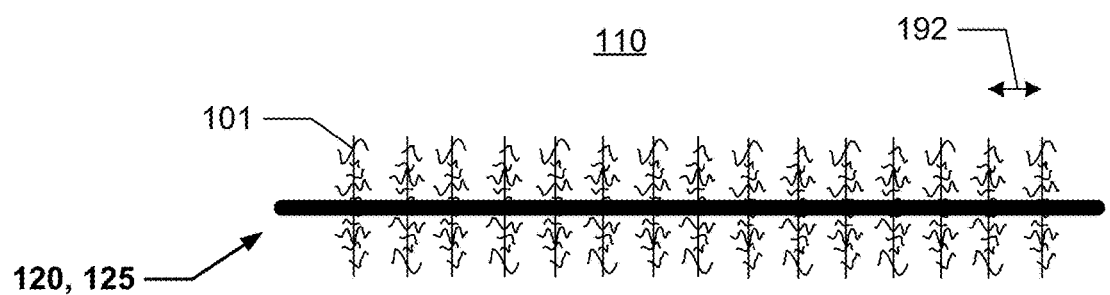

FIGS. 1A and 1B show various views of a field system 100 for producing low permeability geothermal resources according to certain example embodiments. Specifically, FIG. 1A shows a schematic diagram of a land-based field system 100 in which a wellbore 120 has been drilled in a subterranean formation 110. FIG. 1B shows a detail of a substantially horizontal section 104 of the wellbore 120 of FIG. 1A. The field system 100 in this example includes a wellbore 120 disposed in a subterranean formation 110 using field equipment 109 (e.g., a derrick, a tool pusher, a clamp, a tong, drill pipe, casing pipe, a drill bit, a wireline tool, a fluid pumping system) located above a surface 108 and within the wellbore 120. Once the wellbore 120 is drilled, a casing string 125 is inserted into the wellbore 120 to stabilize the wellbore 120 and allow for the extraction of subterranean resources (e.g., steam) from the subterranean formation 110.

The surface 108 can be ground level for an onshore application and the sea floor/lakebed for an offshore application. For offshore applications, at least some of the field equipment can be located on a platform that sits above the water level. The point where the wellbore 120 begins at the surface 108 can be called the wellhead. While not shown in FIGS. 1A and 1B, there can be multiple wellbores 120, each with their own wellhead but that are located close to the other wellheads, drilled into the subterranean formation 110 and having substantially horizontal sections 104 that are close to each other. In such a case, the multiple wellbores 120 can be drilled at the same pad location. When the drilling process is complete, other operations, such as fracturing operations, can be performed. The fractures 101 are shown to be located in the horizontal section 104 of the wellbore 120. The fractures 101, whether induced and/or naturally occurring, can additionally or alternatively be located in other sections (e.g., a substantially vertical section) of the wellbore 120.

The subterranean formation 110 can include one or more of a number of formation types, including but not limited to shale, limestone, sandstone, clay, sand, and salt. In certain embodiments, a subterranean formation 110 can include one or more reservoirs in which one or more resources (e.g., oil, gas, water, steam) can be located. One or more of a number of field operations (e.g., fracturing, coring, tripping, drilling, setting casing, extracting downhole resources) can be performed to reach an objective of a user with respect to the subterranean formation 110. In this case, the objective of a field operation is to drill the wellbore through a portion of the subterranean formation 110 that has low permeability (e.g., <0.1 md, <1.0 md) and minimum porosity (e.g., greater than 2%). The rock in the subterranean formation 110 must have enough porosity to provide fluid for production and allow injected fluid (e.g., water) to flow into and saturate the rock matrix.

The wellbore 120 can have one or more of a number of segments or hole sections, where each segment or hole section can have one or more of a number of dimensions. Examples of such dimensions can include, but are not limited to, size (e.g., diameter) of the wellbore 120, a curvature of the wellbore 120, a total vertical depth of the wellbore 120, a measured depth of the wellbore 120, and a horizontal displacement of the wellbore 120. There can be multiple overlapping casing strings of various sizes (e.g., length, outer diameter) contained within and between these segments or hole sections to ensure the integrity of the wellbore construction. In this case, one or more of the segments of the subterranean wellbore 120 is the substantially horizontal section 104.

As discussed above, inserted into and disposed within the wellbore 120 of FIGS. 1A and 1B are a number of casing pipes that are coupled to each other end-to-end to form the casing string 125. In this case, each end of a casing pipe has mating threads (a type of coupling feature) disposed thereon, allowing a casing pipe to be mechanically coupled to another casing pipe in an end-to-end configuration. The casing pipes of the casing string 125 can be mechanically coupled to each other directly or indirectly using a coupling device, such as a coupling sleeve.

Each casing pipe of the casing string 125 can have a length and a width (e.g., outer diameter). The length of a casing pipe can vary. For example, a common length of a casing pipe is approximately 40 feet. The length of a casing pipe can be longer (e.g., 60 feet) or shorter (e.g., 10 feet) than 40 feet. The width of a casing pipe can also vary and can depend on the cross-sectional shape of the casing pipe. For example, when the cross-sectional shape of the casing pipe is circular, the width can refer to an outer diameter, an inner diameter, or some other form of measurement of the casing pipe. Examples of a width in terms of an outer diameter can include, but are not limited to, 4-½ inches, 7 inches, 7-⅝ inches, 8-⅝ inches, 10-¾ inches, 13-⅜ inches, and 14 inches.

The size (e.g., width, length) of the casing string 125 can be based on the information (e.g., diameter of the borehole drilled) gathered using field equipment with respect to the subterranean wellbore 120. The walls of the casing string 125 have an inner surface that forms a cavity 165 that traverses the length of the casing string 125. Each casing pipe can be made of one or more of a number of suitable materials, including but not limited to steel. Cement 109 is poured into the wellbore 120 through the cavity 165 and then forced upward between the outer surface of the casing string 125 and the wall of the subterranean wellbore 120. In some cases, a liner may additionally be used with or alternatively be used in place of some or all of the casing pipes.

Once the cement dries to form concrete, a number of fractures 101 are induced in the subterranean formation 110. The fractures 101 can be induced in any of a number of ways known in the industry, including but not limited to hydraulic fracturing, fracturing using electrodes, and/or other methods of inducing fractures. An example of fracturing using electrodes can be found in U.S. Pat. No. 9,840,898 issued on Dec. 12, 2017, to Kasevich et al., the entirety of which is herein incorporated by reference. A subterranean formation 110 naturally has fractures 101, but these naturally occurring fractures 101 have inconsistent characteristics (e.g., length, spacing) and so in some cases cannot be relied upon for use in example embodiments without having additional fractures, such as what is shown in FIG. 1B, induced in the subterranean formation 110. Induced fractures 101 typically propagate toward lower stress rock and in the direction perpendicular to the current (at the time of a fracturing operation) least principal horizontal stress.

The various induced fractures 101 that originate at the wellbore 120 and extend outward into the subterranean formation 110 in this case have consistent penetration lengths perpendicular to the wellbore 120 and consistent coverage along the entire lateral length (substantially horizontal section) of the wellbores 120. For example, induced fractures 101 can be 50 meters high and 200 meters long. Further, the induced fractures 101 can be spaced a distance 192 apart from each other. The distance 192 (e.g., 25 meters, 5.3 meters, 11.7 meters) can be set to optimize the matrix permeability and the matrix porosity of the subterranean formation 110.

The induced fractures 101 create a volume 190 within the subterranean formation 110 where the low permeability matrix is connected to high conductivity fractures 101 located a short distance away. Regardless of whether the fractures 101 are induced or natural, the fractures can have a conductivity that is larger than 1 md-ft. This matrix within the volume 190 is conducive to obtaining a large volume of fluid (e.g., water) and heating that fluid (in this case, to generate steam), using the heat inherent in the subterranean formation 110, over time as the fluid remains in the matrix within the volume 190 of the subterranean formation 110. This volume 190 can be known or calculated, particularly over time after one or more cycles of the system and methods described herein are performed. In addition to different configurations of the fractures 101, other considerations for using example embodiments can include, but are not limited to, permeability of the rock matrix, capillary pressure, and the temperature and pressure of the subterranean formation 110.

Figure 2:
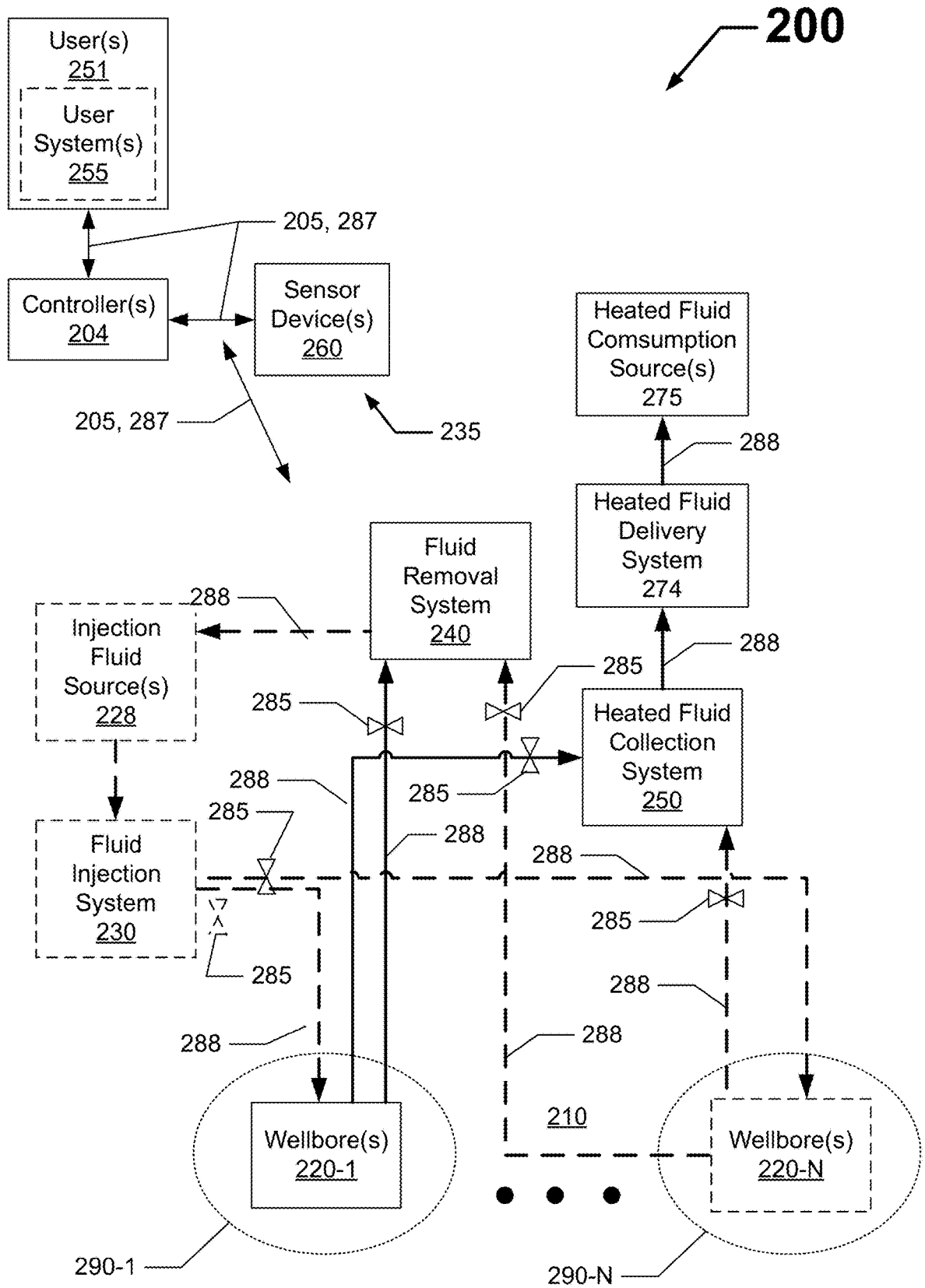
FIG. 2 shows various views of a system for producing a low permeability geothermal resource according to certain example embodiments.

FIG. 2 shows various views of a system 200 for producing a low permeability geothermal resource according to certain example embodiments. The components shown in FIG. 2 are not exhaustive, and in some embodiments, one or more of the components shown in FIG. 2 may not be included in the example system 200. Any component of the system 200 can be discrete or combined with one or more other components of the system 200. Also, one or more components of the system 200 can have different configurations. For example, one or more sensor devices 260 can be disposed within or disposed on other components (e.g., the piping 288, a valve 285, the fluid injection system 230, the fluid collection system 250). As another example, the controller 204, rather than being a stand-alone device, can be part of one or more other components (e.g., the fluid injection system 230, fluid removal system 240, the heated fluid collection system 250) of the system 200.

Referring to FIGS. 1A through 2, system 200 of FIG. 2 includes the fluid injection system 230, the fluid removal system 240, the heated fluid collection system 250, one or more controllers 204, one or more sensor devices 260, one or more users 251 (including one or more optional user systems 255), one or more fluid sources 228, a heated fluid delivery system 274, one or more heated fluid consumption sources 275, piping 288, one or more valves 285, and one or more wellbores 220, where each wellbore 220 has a volume 290 of low permeability rock with high conductivity fractures 101 within the subterranean formation 210. The fluid injection system 230, the fluid removal system 240, and the heated fluid collection system 250, including components thereof, can be considered field equipment 109 discussed above with respect to FIG. 1A. The subterranean formation 210, each volume 290, and each wellbore 220 can be substantially the same as the subterranean formation 110, the volume 190, and the wellbore 120 discussed above with respect to FIGS. 1A and 1B.

In certain example embodiments, when the system 200 includes the optional fluid injection system 230, the system 200 executes iterative, multi-phase cycles to produce the one or more low permeability geothermal resources. Without the fluid injection system 230, the system 200 uses only the fluid removal system 240 followed by the heated fluid collection system 250 to produce low permeability geothermal resources. With the fluid injection system 230, the fluid injection system 230, the fluid removal system 240, and the heated fluid collection system 250 are each used during a different phase (also called a segment herein) of each cycle and can include any equipment (e.g., motors, pumps, compressors) needed to perform their functions. In the first segment of a cycle, or to start the process when there is no fluid injection system 230, the fluid removal system 240 is used. The fluid removal system 240 is configured to remove (extract) fluid (typically in liquid phase, although some gaseous phase fluids can be mixed in with the liquid phase) from a wellbore 220 (e.g., wellbore 220-1, wellbore 220-N).

At times herein, a fluid can be described as having at least a portion in liquid phase. For example, a fluid can be 100% in liquid phase. As another example, a fluid can be mostly in liquid phase with the remaining minority in some other (e.g., gaseous) phase. Such fluid can be or include, but is not limited to, native reservoir fluid, injection fluid (e.g., water), hydraulic fracturing fluid, and connate fluid. The fluid removal system 240 can induce the fluid out of the wellbore 220 or force the fluid out of the wellbore 220. The fluid removal system 240 can include one or more of a number of pieces of equipment to perform its function. Examples of such equipment can include, but are not limited to, a compressor, a motor, a pump, piping (e.g., piping 288), a valve (e.g., valve 285), a controller (e.g., controller 204), and a sensor device (e.g., sensor device 260).

When the fluid removal system 240 removes the fluid from a wellbore 220, the pressure within the wellbore 220 falls rather quickly. Further, much of the fluid that is within (saturates) the rock matrix within the volume 290 (e.g., volume 290-1 for wellbore 220-1, volume 290-N for wellbore 220-N) in the subterranean formation 210 remains there while the fluid in the wellbore 220 is removed. Because of the rock matrix having low permeability (e.g., <0.01 md) and minimal porosity (e.g., >2%) or medium porosity (e.g., approximately 5%), heat within the subterranean formation 210 is efficiently transferred to the liquid spread over the large surface of the rock matrix when the pressure in the wellbore 220 drops and the fluid or injection fluid flows from the rock matrix toward the fractures 101.

In certain example embodiments, the permeability of the rock matrix is no less than 0.0001 md. In other example embodiments, the permeability of the rock matrix is no less than 1.0 nd. In yet other example embodiments, the permeability of the rock matrix is no less than $1.0 \times 10^{-6}$ md. In still other example embodiments, the permeability of the rock matrix is no greater than 0.1 md. In yet other example embodiments, the permeability of the rock matrix is no greater than 0.01 md. In still other example embodiments, the permeability of the rock matrix is between approximately 1.0 nd and 0.1 md. In yet other example embodiments, the permeability of the rock matrix is between approximately 0.0001 md and 0.01 md. In certain example embodiments, the porosity is between approximately 2% and 10%. In other example embodiments, the porosity is between approximately 2% and 5%.

In some cases, the efficiency of transferring heat to the fluid in the low permeability rock matrix depends on the thermal conductivity of the rock. The rock capillary pressure, developed at low fluid saturation, should be high enough to help the rock matrix imbibe the injection fluid injected by the fluid injection system 230, discussed below. The heat transfer transforms the fluid to heated fluid. Without wishing to be bound by theory, it is believed that by dropping pressure in the wellbore 220, fluid flow is forced from the rock matrix to the fractures 101 through a significant pressure drop due to the low permeability of the rock. The flowing fluid boils to two phases and lowers in temperature as it flows to the lower pressure parts of the matrix. This temperature difference forces heat from the matrix to be transferred to the fluid, resulting in enhanced enthalpy or high steam content. In the case where the fluid is water, the water becomes steam as it flows from the rock matrix toward the fractures 101 during production due to heat transfer in the volume 290.

When enough fluid is removed from a wellbore 220 by the fluid removal system 240, the fluid removal system 240 can stop operating. The determination as to whether enough fluid has been removed from a wellbore 220 by the fluid removal system 240, thereby ending the first phase of a cycle when the fluid injection system 230 is included in the system 200, can be made in any number of ways. For example, the first phase can end after the fluid removal system 240 has operated for a certain amount of time (e.g., a day, a week). As another example, operation of the fluid removal system 240 can end when some parameter (e.g., a pressure within the wellbore 220, a flow rate of the fluid, a temperature of the fluid, a content analysis (e.g., an amount of liquid versus gas of the fluid) measured by one or more sensor devices 260 falls outside a range of acceptable values. The range of acceptable values can vary based on a number of factors, including but not limited to the diameter of the wellbore 220, the measured depth of the wellbore 220, the permeability of the rock matrix in the volume 290, the porosity of the rock matrix in the volume 290, the flow rate of the heated fluid, friction values, the pressure in the wellbore 220 adjacent to the fractures 101, the temperature in the wellbore 220 adjacent to the fractures 101, and the requirements (e.g., pressure, flow rate) of the heated fluid by a heated fluid consumption source 275.

In certain example embodiments, when the fluid is water, the operation of the fluid removal system 240 can end when the pressure (e.g., as measured by a sensor device 260) in the wellbore 220 reaches a value below the water saturation pressure at the temperature within the volume 290 of the fractured subterranean formation 210. When this occurs, the steam (a form of heated fluid, discussed below) that forms in the volume 290 of the fractured subterranean formation 210 is able to sustain flow into the wellbore 220 on its own.

In the second segment of a cycle when the fluid injection system 230 is included in the system 200, or otherwise when operation of the fluid removal system 240 ends, the heated fluid collection system 250 is used. The heated fluid collection system 250 is configured to collect heated fluid from the wellbore 220. At times herein, a heated fluid can be described as having at least a portion in vapor phase. For example, a fluid can be 100% in vapor phase. As another example, a fluid can be mostly in vapor phase with the remaining minority in some other (e.g., liquid) phase. In certain example embodiments, the heated fluid is (or includes) steam.

The heated fluid collection system 250 can induce the heated fluid out of the wellbore 220 or force the heated fluid out of the wellbore 220. Alternatively, the heated fluid can leave the wellbore 220 on its own and be collected near the entry point of the wellbore 220 by the heated fluid collection system 250. The fluid that has saturated the rock matrix can boil into the rock matrix to produce the heated fluid having a vapor phase. This heated fluid is then expelled from the rock matrix and flows through the fractures 101 in the volume 290 toward the wellbore 220. The heated fluid collection system 250 can include one or more of a number of pieces of equipment to perform its function. Examples of such equipment can include, but are not limited to, a motor, a pump, a header, piping (e.g., piping 288), a valve (e.g., valve 285), a controller (e.g., controller 204), and a sensor device (e.g., sensor device 260).

Once the heated fluid collection system 250 collects the heated fluid, the heated fluid is transferred through piping 288 using the heated fluid delivery system 274. In addition to transferring the heated fluid from the heated fluid collection system 250, the heated fluid delivery system 274 can process the heated fluid. For example, if the heated fluid has solid particles, minerals, and/or other impurities that could negatively impact the ultimate use of the heated fluid, the heated fluid delivery system 274 can remove such solid particles, minerals, and/or other impurities. As another example, if the heated fluid must be within a certain range of temperatures for its ultimate use, and if the heated fluid is outside of that range of temperatures upon being obtained by the heated fluid delivery system 274, then the heated fluid delivery system 274 can adjust the temperature of the heated fluid up or down, as needed, to bring the temperature of the heated fluid within the required range of temperatures.

The heated fluid delivery system 274 delivers the heated fluid to one or more heated fluid consumption sources 275 using piping 288. Examples of a heated fluid consumption source 275 can include, but are not limited to, an electric generator, an HVAC system, and an industrial system. In certain example embodiments, a heated fluid consumption source 275 is located geographically proximate to the wellbore 220 so that the heated fluid is transported by the heated fluid delivery system 274 with minimal expense and loss in the characteristics (e.g., temperature, pressure) of the heated fluid before reaching the heated fluid consumption source 275.

In cases where the low permeability geothermal resource is produced in cycles, in the third segment of such cycles, the optional fluid injection system 230 is used. The fluid injection system 230 is configured to inject fluid (also called injection fluid herein) into one or more wellbores 220. In certain example embodiments, the injection fluid is in liquid form. The fluid injection system 230 injects the injection fluid into a wellbore 220 for some period of time (e.g., a month). During this time, the injection fluid fills the wellbore 220 and is eventually forced into the fractures (e.g., fractures 101) within the volume 290 of the fractured subterranean formation 210. Eventually, the rock matrix within the volume 290 is filled (saturated) with the injection fluid. At around this point, the third segment of the cycle ends, and the fluid injection system 230 is turned off with respect to that wellbore 220.

The fluid injection system 230 draws the injection fluid from one or more injection fluid sources 228. Examples of an injection fluid source 228 can include, but are not limited to, a natural body of water (e.g., a lake, a river), a man-made body of water, and a storage tank or other vessel. In some cases, the fluid extracted by the fluid removal system 240 in the first phase of a cycle is optionally transferred directly to an injection fluid source 228 using piping 288 to recycle the fluid into injection fluid. In other words, in some cases, the injection fluid can be the same (whether or not having the same proportion of liquid phase to other phases) as the fluid that was extracted by the fluid removal system 240.

The injection fluid can have any of a number of different compositions that are naturally occurring or man-made. The injection fluid can be or include a liquid. At times herein, an injection fluid can be described as having at least a portion in liquid phase. For example, an injection fluid can be 100% in liquid phase. As another example, an injection fluid can be mostly in liquid phase with the remaining minority in some other (e.g., vapor) phase. In some cases, the injection fluid is or includes water. The injection fluid is transferred from an injection fluid source 228 to the fluid injection system 230, from the fluid injection system 230 to a wellbore 220, and from a wellbore 220 to the fluid removal system 240 through piping 288.

Similarly, the heated fluid, which results from heating the fluid or injection fluid in the low permeability rock matrix, can have any of a number of different compositions that are naturally occurring or man-made. The heated fluid can be or include a vapor phase. In some cases, the heated fluid is or includes steam. The heated fluid is transferred from a wellbore 220 to the heated fluid collection system 250, from the heated fluid collection system 250 to the heated fluid delivery system 274, and from the heated fluid delivery system 274 to each heated fluid consumption source 275 using piping 288.

The piping 288 can include multiple pipes, ducts, elbows, joints, sleeves, collars, and similar components that are coupled to each other (e.g., using coupling features such as mating threads) to establish a network for transporting the fluid or the heated fluid, as appropriate. Each component of the piping 288 can have an appropriate size (e.g., inner diameter, outer diameter) and be made of an appropriate material (e.g., steel) to safely and efficiently handle the pressure, temperature, flow rate, and other characteristics of the fluid, the injection fluid, or the heated fluid, as applicable.

When the system 200 includes multiple wellbores 220, the piping 288 can have a number of valves 285 placed in-line with the piping 288 at various locations to control the flow of the fluid and/or heated fluid therethrough. A valve 285 can have one or more of any of a number of configurations, including but not limited to a guillotine valve, a ball valve, a gate valve, a butterfly valve, a pinch valve, a needle valve, a plug valve, a diaphragm valve, and a globe valve. One valve 285 can be configured the same as or differently compared to another valve 285 in the system 200. Also, one valve 285 can be controlled (e.g., manually, automatically by the controller 204) the same as or differently compared to another valve 285 in the system 200.

The system 200 can include one or more controllers 204. A controller 204 of the system 200 communicates with and in some cases controls one or more of the other components (e.g., a sensor device 260, the fluid injection system 230, the fluid removal system 240, the heated fluid collection system 250) of the system 200. The controller 204 performs a number of functions that include obtaining and sending data, evaluating data, following protocols, running algorithms, and sending commands. The controller 204 can include one or more of a number of components. Such components of the controller 204 can include, but are not limited to, a control engine, a communication module, a timer, a counter, a power module, a storage repository, a hardware processor, memory, a transceiver, an application interface, and a security module. When there are multiple controllers 204 (e.g., one controller 204 for the optional fluid injection system 230, another controller 204 for the fluid removal system 240, yet another controller 204 for the heated fluid collection system 250), each controller 204 can operate independently of each other. Alternatively, one or more of the controllers 204 can work cooperatively with each other. As yet another alternative, one of the controllers 204 can control some or all of one or more other controllers 204 in the system 200. Each controller 204 can be considered a type of computer device, as discussed below with respect to FIG. 3. An example of the various components of a controller 204 is shown below in FIG. 14.

Each sensor device 260 includes one or more sensors that measure one or more parameters (e.g., pressure, flow rate, temperature, humidity, fluid content, voltage, current, permeability, porosity, rock characteristics, strata in the subterranean formation 210). Examples of a sensor of a sensor device 260 can include, but are not limited to, a temperature sensor, a flow sensor, a pressure sensor, a gas spectrometer, a voltmeter, an ammeter, a seismograph, a permeability meter, a porosimeter, and a camera. A sensor device 260 can be or include, by way of example, seismic technology, a wireline device, and a measurement while drilling (MWD) tool. A sensor device 260 can be integrated with or measure a parameter associated with one or more components of the system 200. For example, sensor device 260 can be configured to measure a parameter (e.g., flow rate, pressure, temperature) of the fluid or heated fluid flowing through the piping 288 at a particular location (e.g., in a wellbore 220, between a wellbore 220 and the fluid removal system 240). As another example, a sensor device 260 can be configured to determine how open or closed a valve 285 within the system 200 is. As yet another example, one or more sensor devices 260 can be used to identify, either at the surface 108 before a wellbore 220 is drilled or within a wellbore 220, a volume 290 within the subterranean formation 210 that has a desired permeability and porosity to be used as a geothermal resource herein.

In some cases, a number of sensors and/or sensor devices 260, each measuring a different parameter, can be used in combination to determine and confirm whether a controller 204 should take a particular action (e.g., operate a valve 285, shut down or start up the fluid removal system 240). Some or all of the sensor devices 260 can be referred to as a measurement system 235 herein. Such a measurement system 235 can also include a controller 204. When a sensor device 260 includes its own controller 204, then the sensor device 260 can be considered a type of computer device, as discussed below with respect to FIG. 3.

A user 251 can be any person that interacts with a controller 204. Examples of a user 251 may include, but are not limited to, a business owner, an engineer, a company representative, a geologist, a consultant, a drilling engineer, an inventory management system, an inventory manager, a labor scheduling system, a contractor, and a manufacturer's representative. A user 251 can use one or more user systems 255, which may include a display (e.g., a GUI). A user system 255 of a user 251 can interact with (e.g., send data to, obtain data from) the controller 204 via an application interface and using the communication links 205. The user 251 can also interact directly with the controller 204 through a user interface (e.g., keyboard, mouse, touchscreen).

Interaction between each controller 204, the sensor devices 260, the users 251 (including any associated user systems 255), and other components (e.g., the valves 285, the optional fluid injection system 230, the fluid removal system 240, and the heated fluid collection system 250) of the system 200 can be conducted using communication links 205 and/or power transfer links 287. Each communication link 205 can include wired (e.g., Class 1 electrical cables, Class 2 electrical cables, electrical connectors, Power Line Carrier, RS485) and/or wireless (e.g., Wi-Fi, Zigbee, visible light communication, cellular networking, Bluetooth, WirelessHART, ISA100) technology. A communication link 205 can transmit signals (e.g., communication signals, control signals, data) between each controller 204, the sensor devices 260, the users 251 (including any associated user systems 255), and other components of the system 200.

Each power transfer link 287 can include one or more electrical conductors, which can be individual or part of one or more electrical cables. In some cases, as with inductive power, power can be transferred wirelessly using power transfer links 287. A power transfer link 287 can transmit power between each controller 204, the sensor devices 260, the users 251 (including any associated user systems 255), and other components of the system 200. Each power transfer link 287 can be sized (e.g., 12 gauge, 18 gauge, 4 gauge) in a manner suitable for the amount (e.g., 480V, 24V, 120V) and type (e.g., alternating current, direct current) of power transferred therethrough.

Figure 3:
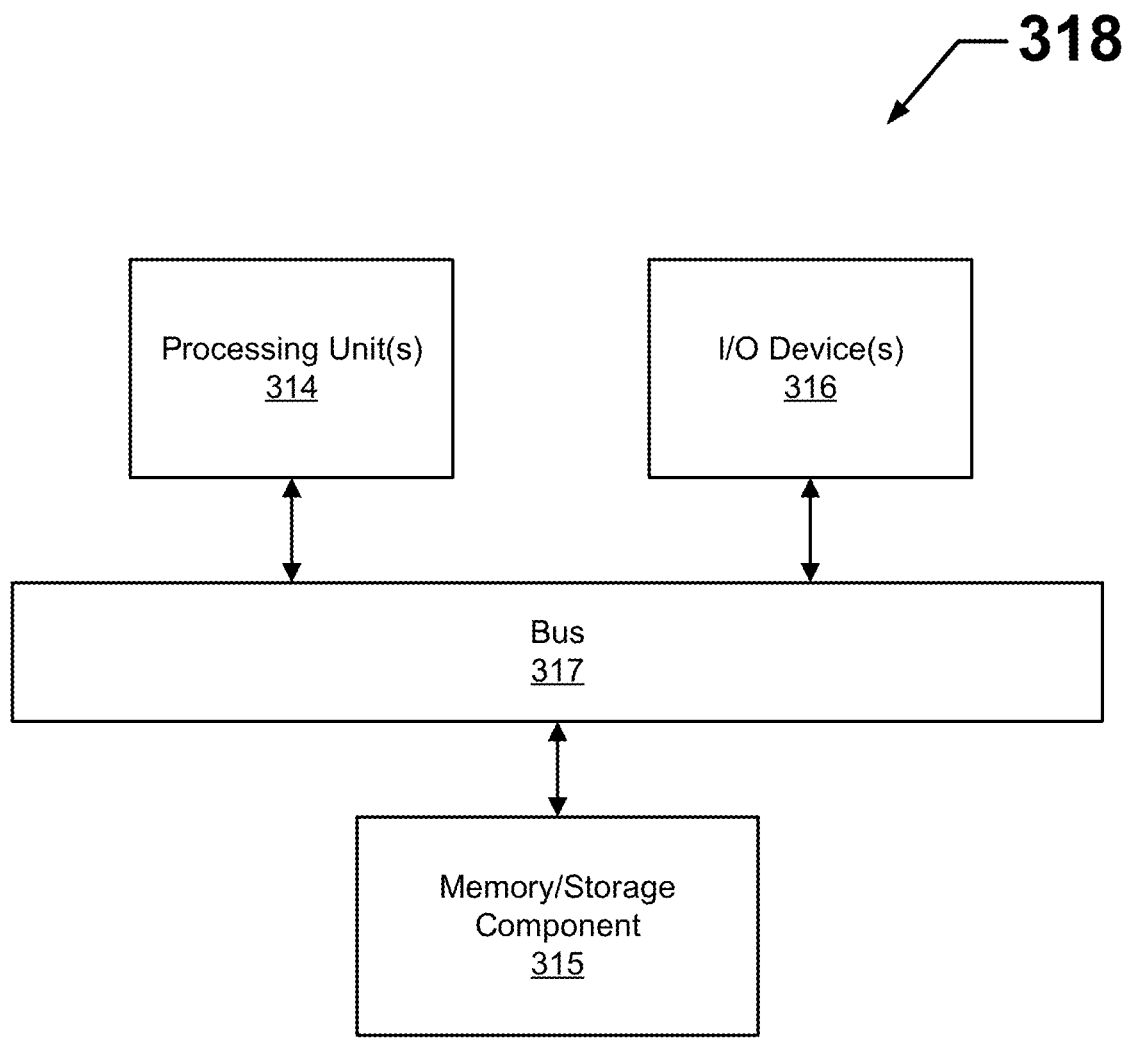
FIG. 3 shows a computing device in accordance with certain example embodiments.

FIG. 3 illustrates one embodiment of a computing device 318 that implements one or more of the various techniques described herein, and which is representative, in whole or in part, of the elements described herein pursuant to certain example embodiments. For example, the controller 204 (including components thereof, such as a control engine, a hardware processor, a storage repository, a power supply, and a transceiver) can be considered a computing device 318. Computing device 318 is one example of a computing device and is not intended to suggest any limitation as to scope of use or functionality of the computing device and/or its possible architectures. Neither should the computing device 318 be interpreted as having any dependency or requirement relating to any one or combination of components illustrated in the example computing device 318.

The computing device 318 includes one or more processors or processing units 314, one or more memory/storage components 315, one or more input/output (I/O) devices 316, and a bus 317 that allows the various components and devices to communicate with one another. The bus 317 represents one or more of any of several types of bus structures, including a memory bus or memory controller, a peripheral bus, an accelerated graphics port, and a processor or local bus using any of a variety of bus architectures. The bus 317 includes wired and/or wireless buses.

The memory/storage component 315 represents one or more computer storage media. The memory/storage component 315 includes volatile media (such as random access memory (RAM)) and/or nonvolatile media (such as read only memory (ROM), flash memory, optical disks, magnetic disks, and so forth). The memory/storage component 315 includes fixed media (e.g., RAM, ROM, a fixed hard drive, etc.) as well as removable media (e.g., a Flash memory drive, a removable hard drive, an optical disk, and so forth).

One or more I/O devices 316 allow a user 130 to enter commands and information to the computing device 318, and also allow information to be presented to the user 130 and/or other components or devices. Examples of input devices 316 include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 318 is connected to a network (not shown) (e.g., a Local Area Network (LAN), a Wide Area Network (WAN) such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 318 includes at least the minimal processing, input, and/or output means necessary to practice one or more embodiments.

Further, those skilled in the art will appreciate that one or more elements of the aforementioned computer device 318 is located at a remote location and connected to the other elements over a network in certain example embodiments. Further, one or more embodiments is implemented on a distributed system having one or more nodes, where each portion of the implementation (e.g., the optional fluid injection system 230, the fluid removal system 240, the heated fluid collection system 250) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 4:
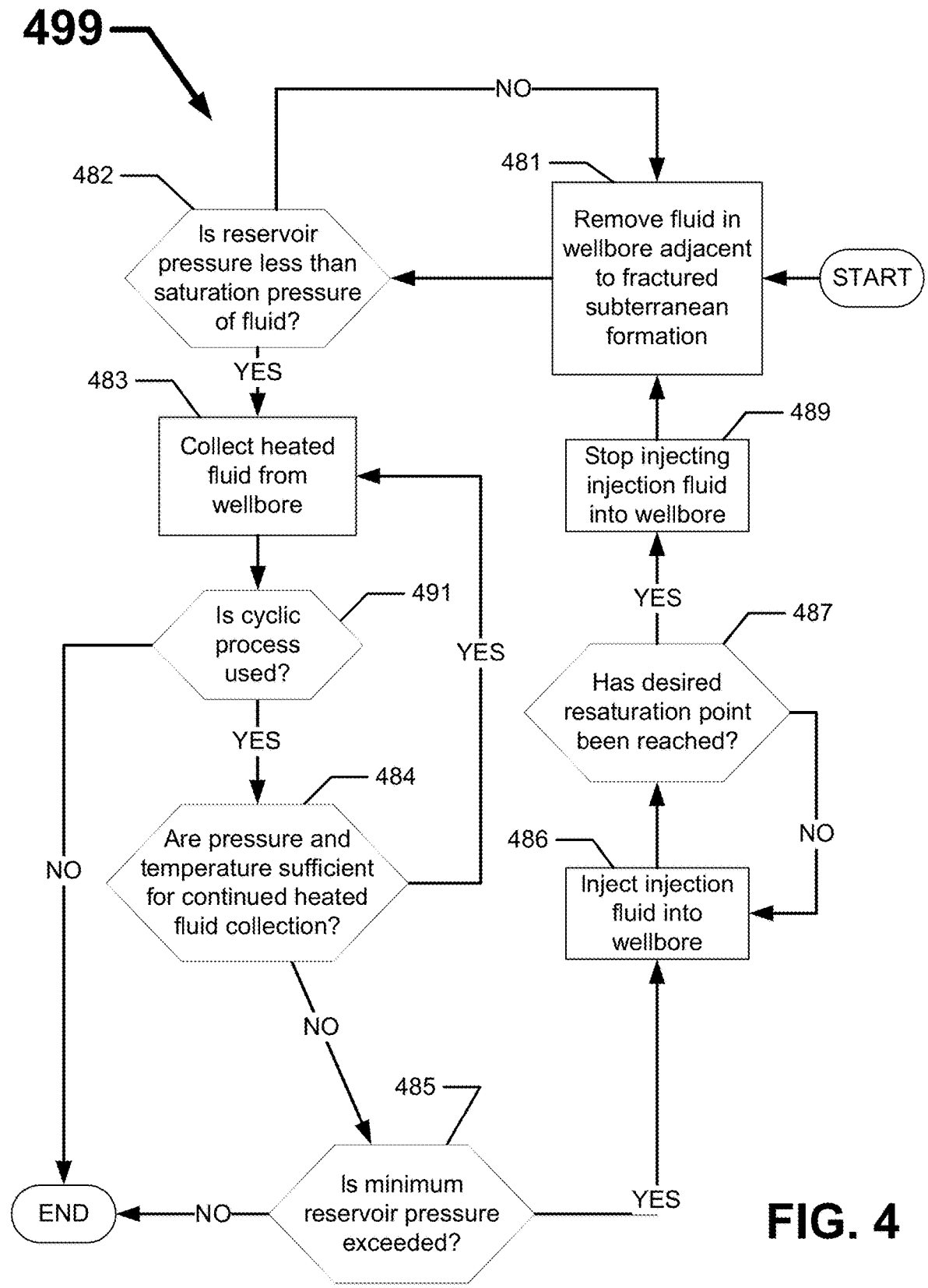
FIG. 4 shows a flowchart of a method for producing a low permeability geothermal resource according to certain example embodiments.

FIG. 4 shows a flowchart 499 of a method for producing a low permeability geothermal resource according to certain example embodiments. While the various steps in this flowchart 499 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 4 may be included in performing this method. Accordingly, the specific arrangement of steps should not be construed as limiting the scope. Further, a particular computing device, such as the computing device discussed above with respect to FIG. 3, can be used to perform one or more of the steps for the methods shown in FIG. 4 in certain example embodiments. Any of the functions performed below by the controller 404 can involve the use of one or more protocols, one or more algorithms, and/or stored data stored in a storage repository.

The method shown in FIG. 4 is merely an example that can be performed by using an example system described herein. In other words, systems for producing a low permeability geothermal resource can perform other functions using other methods in addition to and/or aside from those shown in FIG. 4. Referring to FIGS. 1A through 4, the method shown in the flowchart 499 of FIG. 4 begins at the START step and proceeds to step 481, where fluid in a wellbore 220 adjacent to a fractured subterranean formation 210 is removed. More specifically, a portion of the wellbore 220 is disposed within a volume 290, where the volume 290 includes a number of fractures 101 (e.g., induced fractures) in the subterranean formation 210 that extend outward from the wellbore 220. The fractures 101 connect to the low permeability rock matrix within the volume 290.

In certain example embodiments, the fluid is or includes water (liquid phase). In some cases, as when the fluid removal system 240 is close to being shut down, the fluid is a mixture of vapor phase (e.g., steam) and liquid phase (e.g., hot water). The fluid can be removed from the wellbore 220 by the fluid removal system 240 using piping 288. The fluid removal system 240 can remove the fluid from the wellbore 220 using an inducement method (e.g., a compressor located at the surface 108 and a coiled injection tubing line dropped into the wellbore 220), a forced method, and/or any other type of method known in the art. The fluid removal system 240 can be controlled by a controller 204. Alternatively, the fluid removal system 240 can be controlled by a user. When the low permeability geothermal resource is produced in multiple cycles, then the fluid that is removed for every cycle after the first cycle in this step 481 is injection fluid.

In step 482, a determination is made as to whether the reservoir pressure is less than (below) the saturation pressure of the fluid. The reservoir pressure refers to the pressure of the fractured subterranean formation 210 within the volume 290. These pressures are compared against a threshold value or a range of acceptable values. One or both of these pressures can be measured by one or more of the sensor devices 260. In addition, or in the alternative, one or both of these pressures can be calculated by the controller 204 using one or more algorithms. In such a case, a pressure can be calculated using another parameter (e.g., temperature) measured by a sensor device 260. The determination can be made by a user. Alternatively, the determination can be made by a controller 204.

The determination can be made continuously, periodically, randomly, upon the occurrence of some event, or on some other basis. If the reservoir pressure is less than the saturation pressure of the fluid, then the fluid removal system 240 is shut down (thereby ending the first phase of a cycle), and the process proceeds to step 483. Shutting down the fluid removal system 240 can be performed by a user or the controller 204. If the reservoir pressure is not less than the saturation pressure of the fluid, then the process reverts to step 481, which means that the first phase of the cycle continues with the fluid removal system 240 continuing to operate, thereby continuing the first phase of a cycle.

In step 483, heated fluid is collected form the wellbore 220. The heated fluid can be collected from the wellbore 220 by the heated fluid collection system 250. In certain example embodiments, the heated fluid is steam (all vapor phase). In alternative embodiments, the heated fluid is a mixture of vapor phase (e.g., steam) and liquid phase (e.g., hot water). The heated fluid can be collected by the heated fluid collection system 250 using piping 288. The heated fluid collection system 250 can remove the heated fluid from the wellbore 220 using an inducement method, a forced method, and/or any other type of method known in the art. The heated fluid collection system 250 can be controlled by a controller 204. Alternatively, the heated fluid collection system 250 can be controlled by a user.

The heated fluid can be expelled from the low permeability rock matrix of the fractured subterranean formation 210 until the heated fluid having the vapor phase becomes superheated (e.g., the temperature of the heated fluid is greater than the saturation temperature for the fluid at the prevailing pressure). As the heated fluid is collected by the heated fluid collection system 250, the heated fluid can be delivered to one or more heated fluid consumption systems 275 by the heated fluid delivery system 274. The heated fluid delivery system 274 can also be used to process (e.g., remove unwanted impurities, control temperature, control pressure) the heated fluid so that the heated fluid is suitable for the sustainable operation of a heated fluid consumption system 275. The heated fluid delivery system 274 and/or one or more of the heated fluid consumption systems 275 can be controlled by a controller 204. Alternatively, the heated fluid delivery system 274 and/or one or more of the heated fluid consumption systems 275 can be controlled by a user.

In certain example embodiments, the heated fluid must have certain minimum characteristics (e.g., pressure of at least 6 bara or 87 psia) when it reaches the top of the wellbore 220 in order to be used by a heated fluid consumption system 275. For example, when a heated fluid consumption system 275 is an electric generator with a condensing turbine having an inlet pressure of 6 bara, and when the heated fluid is steam, in order to generate 1 MWe the steam must have a flow rate of approximately 2.1 kg/s. In such a case, the minimum pressure at the bottom of the wellbore 220 needed to deliver steam at a pressure of at least 6 bara at the surface of the wellbore 220 is at least 10 bara. This assumes that the substantially horizontal section 104 of the wellbore 220 is approximately 10,000 feet long.

As an example of parameters of a wellbore 220 that can produce a heated fluid with suitable characteristics for use by a heated fluid consumption system 275, the wellbore 220 can have a measured depth of approximately 4,000 meters. The wellbore 220 can be completed with 13-⅜" casing for the first 2,000 meters and followed by 11-½" casing for the remainder of the wellbore 220. The rugosity of the casing pipe can be no greater than approximately 0.046 mm. The flow rate for the heated fluid (e.g., steam) can be approximately 7.3 kg/s along the entire measured depth of the wellbore 220. Gravity is the main factor for changing the pressure of the heated fluid, which measures approximately 10 bara at 4,000 meters of measured depth in the wellbore 220 and approximately 6 bara at the opening of the wellbore 220. In some cases, when the heated fluid is steam, the production of steam from the rock matrix in the volume 290 will not be enough to generate the required load (e.g., power) of a heated fluid consumption source 275 (e.g., a thermal generator) when the pressure at that depth falls below 10 bara.

In step 491, a determination is made as to whether a cyclic process to produce the low permeability geothermal resource is being used. The cyclic process is used when the optional fluid injection system 230 is included in the system 200, thereby injecting fluid into the wellbore 220 to resaturate the rock matrix within the volume 290. The determination can be made by a user. Alternatively, the determination can be made by a controller 204. The determination can be made continuously, periodically, randomly, upon the occurrence of some event, or on some other basis. If the cyclic process to produce the low permeability geothermal resource is being used, then the process proceeds to step 484. If the cyclic process to produce the low permeability geothermal resource is not being used, then the process proceeds to the END step as the heated fluid collection system 250 continues to operate until the low permeability geothermal resource is depleted. In other words, if injection fluid is not injected into the wellbore 220 to resaturate the low permeability rock matrix within the volume 290, then the downhole pressure will drop below the level at which the rock matrix can continue to heat the fluid within the low permeability rock matrix to generate heated fluid.

In step 484, a determination is made as to whether the temperature and pressure are sufficient for continued heated fluid collection. Put another way, a determination is made as to whether the rock matrix within the volume 290 needs to be resaturated with injection fluid, provided by the fluid injection system 230, in order to begin another cycle and continue using the low permeability geothermal resource within the volume 290. The temperature and pressure can be compared against a threshold value or a range of acceptable values. The temperature and/or the pressure can be measured by one or more of the sensor devices 260. In addition, or in the alternative, one or both of the temperature and pressure can be calculated by the controller 204. In such a case, the pressure and/or the temperature can be calculated using one or more other parameters measured by a sensor device 260.

The determination can be made by a user. Alternatively, the determination can be made by a controller 204. The determination can be made continuously, periodically, randomly, upon the occurrence of some event, or on some other basis. If the temperature and pressure are sufficient for continued heated fluid collection, then the process reverts to step 483, which continues the operation of the heated fluid collection system 250 and the second segment of the cycle. If the temperature and pressure are not sufficient for continued heated fluid collection, then the process proceeds to step 485.

In step 485, a determination is made as to whether a minimum reservoir pressure is exceeded. If the pressure drops too low, the ability to continue to use the rock matrix within the volume 290 can be lost. The pressure is compared against a threshold value or a range of acceptable values. As discussed above, the range of acceptable values can vary based on a number of factors, including but not limited to the diameter of the wellbore 220, the measured depth of the wellbore 220, the permeability of the rock matrix in the volume 290, the porosity of the rock matrix in the volume 290, the flow rate of the heated fluid, friction values, the pressure in the wellbore 220 adjacent to the fractures 101, the temperature in the wellbore 220 adjacent to the fractures 101, and the requirements (e.g., pressure, flow rate) of the heated fluid by a heated fluid consumption source 275. The pressure can be measured by one or more of the sensor devices 260. In addition, or in the alternative, the pressure can be calculated by the controller 204. In such a case, the pressure can be calculated using one or more other parameters (or a pressure in a different location) measured by a sensor device 260.

The determination can be made by a user. Alternatively, the determination can be made by a controller 204. The determination can be made continuously, periodically, randomly, upon the occurrence of some event, or on some other basis. In some cases, one or more additional or alternative determinations can be made as to whether to stop collecting heated liquid and to start injecting injection fluid into the wellbore 220. For example, a determination can be made as to whether the rock matrix within the volume 290 is sufficiently dry. If the minimum pressure is exceeded, then the process proceeds to step 486. If the minimum pressure is not exceeded, then the process proceeds to the END step. In other words, if there is not sufficient pressure within the rock matrix in the volume 290, then no more heated fluid can be collected from the wellbore 220.

In step 486, injection fluid is injected into the wellbore 220. The injection fluid injected into the wellbore 220 can be the same fluid as in step 481 or a different fluid. The injection fluid can be injected into the wellbore 220 by the fluid injection system 230. The injection fluid can originate in and be drawn by the fluid injection system 230 from one or more injection fluid sources 228. The fluid injection system 230 can be controlled by a controller 204. Alternatively, the fluid injection system 230 can be controlled by a user. Injecting injection fluid into the wellbore 220 represents the third segment of a cycle. As the injection fluid is injected into a wellbore 220, the injection fluid flows into the fractures 101 in the volume 290. Over time (e.g., a month, three months, two weeks), the rock matrix formed by the fractures 101 within the volume 290 become totally or partially saturated with the injection fluid.

In step 487, a determination is made as to whether the desired resaturation point has been reached. The desired resaturation point can be defined by operational conditions and can change from cycle to cycle. One or more factors that can determine the desired resaturation point can include, but are not limited to, trying to minimize the amount of time that injection fluid is injected into the wellbore 220 and extending the viable life of the low permeability geothermal resource within the volume 290. The determination can be made by a controller 204. Alternatively, the determination can be made by a user. The determination can be based, in part, on measurements of one or more parameters (e.g., pressure, temperature) made by one or more sensor devices 260. The determination can be made continuously, periodically, randomly, upon the occurrence of some event, or on some other basis. If the desired resaturation point has not been reached, then the process reverts to step 486. If the desired resaturation point has been reached, then the process proceeds to step 489.

In step 489, the injection fluid is stopped from being injected into the wellbore 220. In other words, the fluid injection system 230 is shut down. Injecting injection fluid into the wellbore 220 can be stopped by a controller 204 or a user. Stopping the process of injecting injection fluid into the wellbore 220 ends the third phase of a cycle. Simultaneously, stopping the process of injecting injection fluid into the wellbore 220 begins the first segment of a subsequent cycle, as the process reverts to step 481.

When multiple cycles are involved in the method captured in the flowchart 499, the amount of time that the production of the low permeability geothermal resource (the rock matrix within the volume 290) can be extended significantly. Also, when multiple cycles are involved in producing a low permeability geothermal resource, a subsequent cycle (including individual segments of that subsequent cycle) can take the same amount of time or less time than the previous cycle (including corresponding individual segments of the previous cycle).

Figure 5:
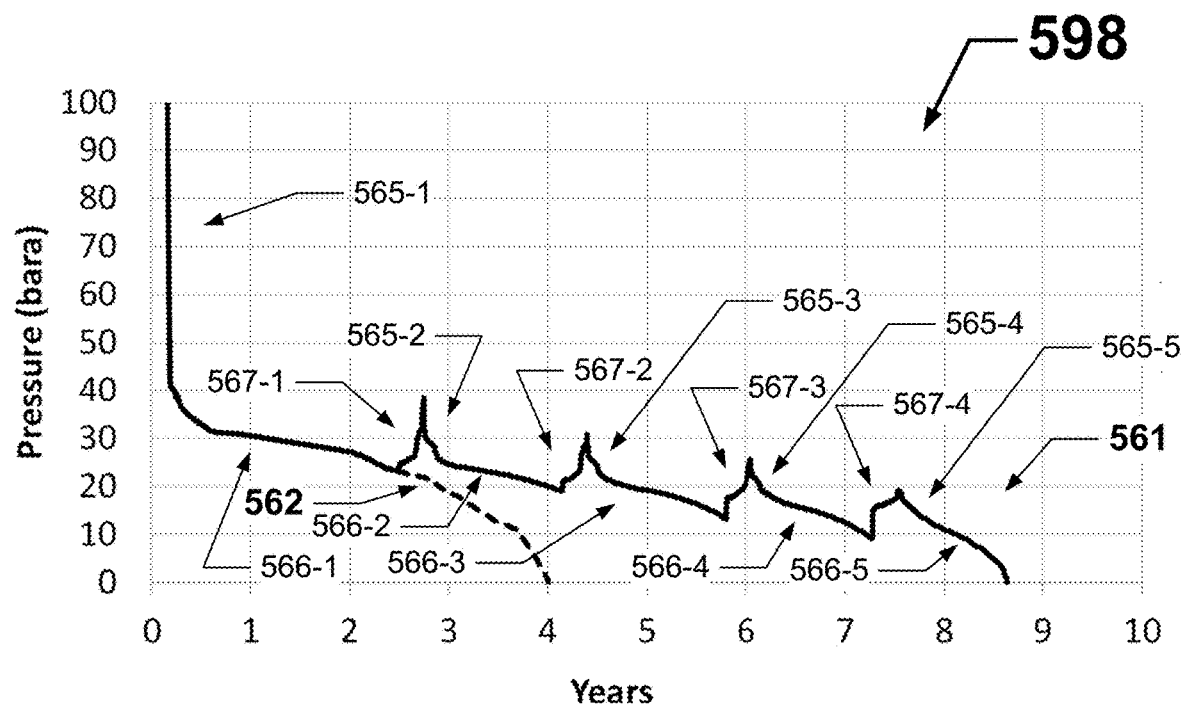
FIG. 5 shows a graph of pressure toward the bottom of a wellbore over time according to certain example embodiments.

FIG. 5 shows a graph 598 of pressure toward the bottom of a wellbore 220 over time according to certain example embodiments. Referring to FIGS. 1A through 5, the graph 598 shows two plots (plot 561 and plot 562) of pressure (along the vertical axis in units of bara) versus time (along the horizontal axis in units of years). Plot 561 (shown in a solid line) represents the iterative cycle method discussed with respect to FIG. 4, to produce a low permeability geothermal resource in a volume 290 of a fractured subterranean resource 210. Plot 562 (shown in a dashed line) represents only using the fluid removal system 240 and the heated fluid collection system 250, without the fluid injection system 230, to produce the same low permeability geothermal resource in a volume 290 of a fractured subterranean resource 210.

Plot 561 and plot 562 are coincident for the first 2.4 years, at which point plot 561 breaks the downward trend in pressure over time by initiating injection of injection fluid into the wellbore 220 using the fluid injection system 230, and then begin a new cycle when the fluid injection system 230 is finished. Plot 562, without benefit of the fluid injection system 230 to raise the pressure in the wellbore 220 and resaturate the rock matrix, falls below the minimum pressure (in this case, 10 bara) required to continue producing the low permeability geothermal resource at approximately 3.6 years and completely loses pressure in the wellbore 220 at 4.0 years. By contrast, plot 561 continues to produce the low permeability geothermal resource surrounding the wellbore 220 for over 8 years. For both plot 561 and plot 562, in the time frame covered from the start (0 years) to approximately 0.2 years, fluid is removed from the wellbore 220 by the fluid removal system 240 in order to dramatically drop the pressure within the wellbore 220. This process, labeled as segment 565-1, coincides with step 481 in FIG. 4. Next, also for both plot 561 and plot 562, in the time frame covered from approximately 0.2 years to 2.4 years, heated fluid is collected from the wellbore 220 by the heated fluid collection system 250. This process, labeled as segment 566-1, coincides with step 483 in FIG. 4. Without the fluid injection system 230, nothing more is done with respect to the plot 562, and so the low permeability geothermal resource is completely depleted at around 4 years.

Using the fluid injection system 230, as shown by plot 561, production of the low permeability geothermal resource continues in multiple cycles. Specifically, as the pressure toward the bottom of the wellbore 220 approaches 10 bara (in this case, when the pressure is around 23 bara), in the time frame covered by 2.4 years and 2.7 years, segment 567-1, which coincides with step 486 of FIG. 4, takes place. Once the rock matrix within the volume has been saturated with the injection fluid, a new cycle begins with segment 565-2, which coincides with step 481 of FIG. 4, at around 2.7 years and lasts until about 2.8 years, starting a new cycle. When segment 565-2 is complete, segment 566-2, which coincides with step 483 in FIG. 4, takes place from about 2.8 years and 4.1 years. As the pressure toward the bottom of the wellbore 220 approaches 10 bara (in this case, when the pressure is around 19 bara), in the time frame covered by 4.1 years and 4.4 years, segment 567-2, which coincides with step 486 of FIG. 4, takes place.

As the rock matrix within the volume 290 again becomes saturated with the injection fluid, segment 565-3, which coincides with step 481 of FIG. 4, takes place from 4.4 years until about 4.5 years, starting another cycle. When segment 565-3 is complete, segment 566-3, which coincides with step 483 in FIG. 4, takes place from about 4.5 years and 5.8 years. As the pressure toward the bottom of the wellbore 220 approaches 10 bara (in this case, when the pressure is around 14 bara), in the time frame covered by 5.8 years and 6.0 years, segment 567-3, which coincides with step 486 of FIG. 4, takes place.

As the rock matrix within the volume 290 again becomes saturated with the injection fluid, segment 565-4, which coincides with step 481 of FIG. 4, takes place from 6.0 years until about 6.1 years, starting yet another cycle. When segment 565-4 is complete, segment 566-4, which coincides with step 483 in FIG. 4, takes place from about 6.1 years and 7.2 years. As the pressure toward the bottom of the wellbore 220 approaches 10 bara, in the time frame covered by 7.2 years and 7.5 years, segment 567-4, which coincides with step 486 of FIG. 4, takes place.

As the rock matrix within the volume 290 again becomes saturated with the injection fluid, segment 565-5, which coincides with step 481 of FIG. 4, takes place from 7.5 years until about 7.6 years, starting a final cycle. When segment 565-5 is complete, segment 566-5, which coincides with step 483 in FIG. 4, begins at about 7.6 years. At approximately 8.2 years, the pressure at the bottom of the wellbore 220 falls below the minimum pressure (approximately 10 bara) required to continue producing the low permeability geothermal resource at approximately, and at approximately 8.6 years there is a complete loss of pressure at the bottom of the wellbore 220. In this way, the example embodiments described herein that use the fluid injection system 230 produce the low permeability geothermal resource for approximately 4.5 years longer than the example embodiments that do not resaturate (recharge) the rock matrix in the low permeability geothermal resource using the fluid injection system 230.

Figure 6:
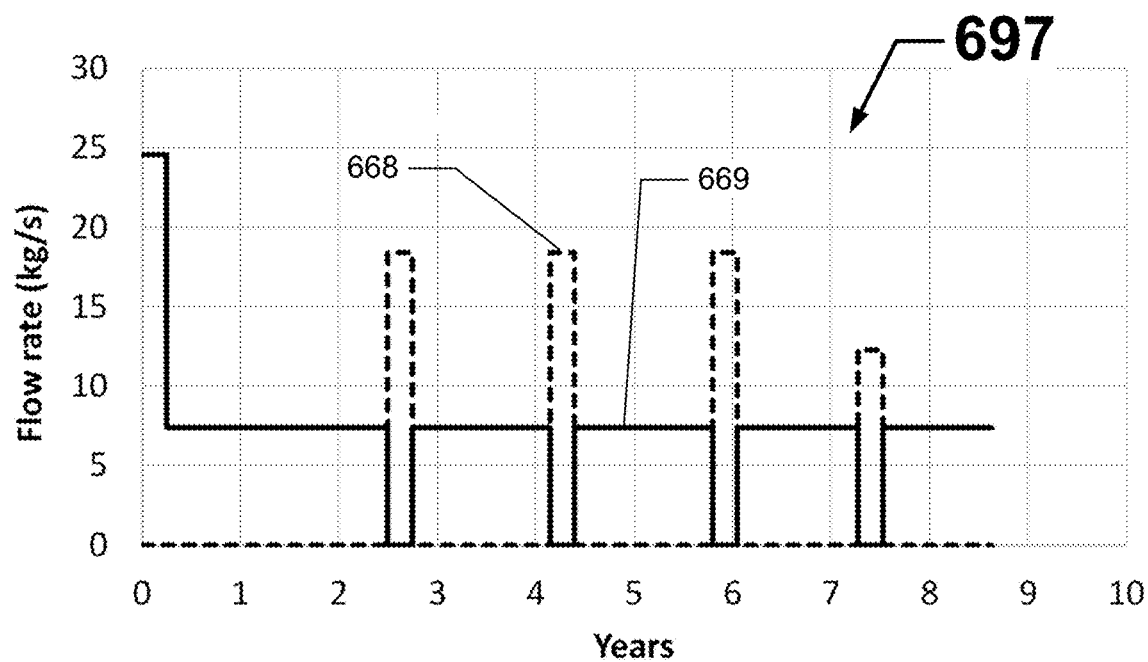
FIG. 6 shows a graph of flow rates over time for the production of low permeability geothermal resources shown in the graph of FIG. 5.

FIG. 6 shows a graph 697 of flow rates over time for the production of low permeability geothermal resources shown in the graph 598 of FIG. 5. Referring to FIGS. 1A through 6, the graph 697 shows two plots of flow rate (along the vertical axis in units of kg/s) versus time (along the horizontal axis in units of years). Plot 668, shown in dashed line, represents the flow rate of injection fluid being injected into the wellbore 220. Plot 669, shown in solid line, represents the flow rate of fluid and heated fluid being produced (removed and collected, respectively) from the wellbore 220.

The flow rate shown in plot 668 is substantially zero except for the times that coincide with segment 567-1, segment 567-2, segment 567-3, and segment 567-4 in the plot 561 of the graph 598 of FIG. 5. The flow rate of the liquid being injected into the wellbore 220 at the times that coincide with segment 567-1, segment 567-2, and segment 567-3 is approximately 18 kg/s. The flow rate of the liquid being injected into the wellbore 220 at the times that coincide with segment 567-4 is approximately 12.5 kg/s. During these times when liquid is injected into the wellbore 220, nothing is being produced from the wellbore 220. As a result, plot 669 shows a flow rate of substantially zero at these times.

As shown by plot 669, when the fluid and heated fluid are being extracted and collected, respectively, from the wellbore 220, the flow rate is approximately 7.5 kg/s from 0.2 years until approximately 8.7 years, subject to the periods of injection of the injection fluid discussed above, where the flow rate is substantially zero. Plot 669 stops at 8.7 years, after which there is no pressure toward the distal end of the wellbore 220.

Figure 7:
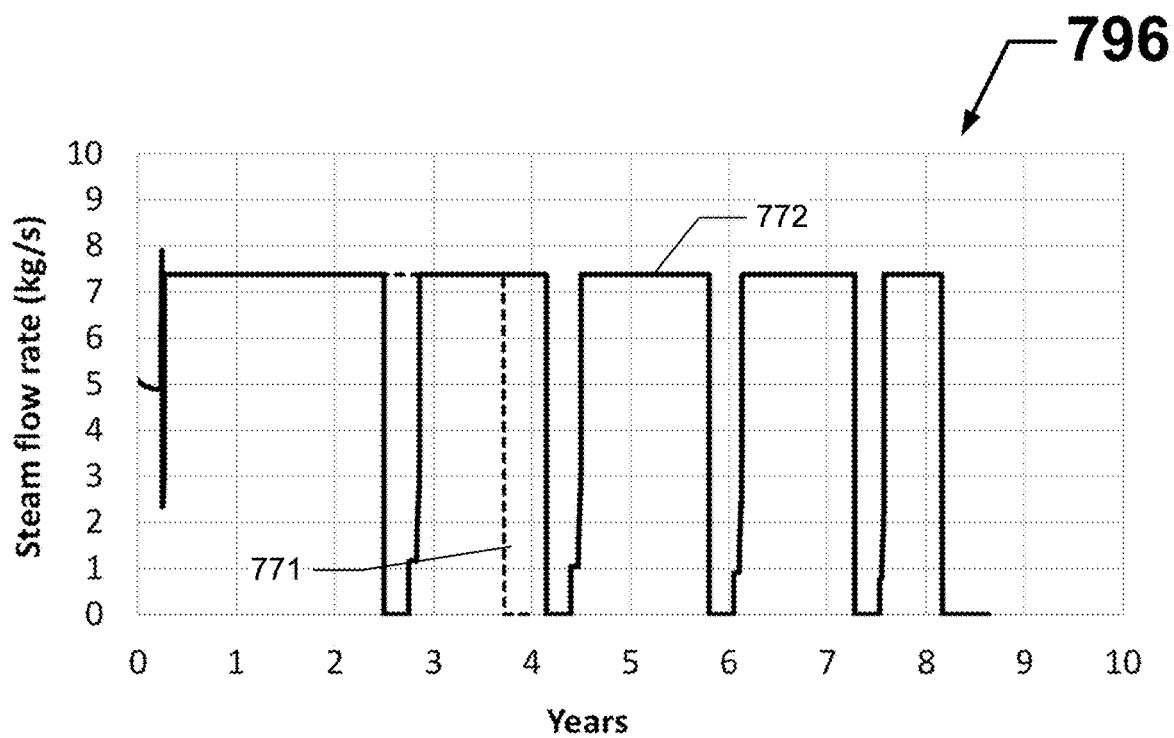
FIG. 7 shows a graph of flow rates of only the heated fluid over time for the production of low permeability geothermal resources shown in the graph of FIG. 5.

FIG. 7 shows a graph 796 of flow rates of only the heated fluid (in this case, steam) over time for the production of low permeability geothermal resources shown in the graph 598 of FIG. 5. Referring to FIGS. 1A through 7, the graph 796 shows two plots of flow rate (along the vertical axis in units of kg/s) of the heated fluid versus time (along the horizontal axis in units of years). Plot 771, shown in dashed line, represents the flow rate of heated fluid being collected from the wellbore 220 using example embodiments that do not include a fluid injection system 230 to periodically (cyclically) resaturate the low permeability rock matrix. Plot 772, shown in solid line, represents the flow rate of heated fluid being collected from the wellbore 220 using example embodiments that include a fluid injection system 230 to cyclically resaturate the low permeability rock matrix. In plot 771, the flow rate of the heated fluid is substantially constant at 7.5 kg/s from 0.2 years until about 4.0 years, when the flow rate of the heated fluid falls to zero. This matches what is shown in the plot 562 of the graph 598 of FIG. 5, when the wellbore 220 loses pressure after 4 years.

In plot 772, the flow rate is substantially zero during the times that coincide with segment 567-1, segment 567-2, segment 567-3, and segment 567-4 in the plot 561 of the graph 598 of FIG. 5. The flow rate in the plot 772 also is substantially zero at the time when the pressure of the wellbore 220, as shown in the plot 561 in FIG. 5, falls below the 10 bara required to maintain production of the low permeability geothermal resource within the subterranean formation 210. Also with plot 772, the flow rate of the heated fluid (e.g., steam) during the times that coincide with segment 565-1, segment 565-2, segment 565-3, and segment 565-4 is approximately 1 kg/s. Finally, in plot 772, the flow rate of the heated fluid during the times that coincide with segment 566-1, segment 566-2, segment 566-3, and segment 566-4 is approximately 7.5 kg/s.

Figure 8:
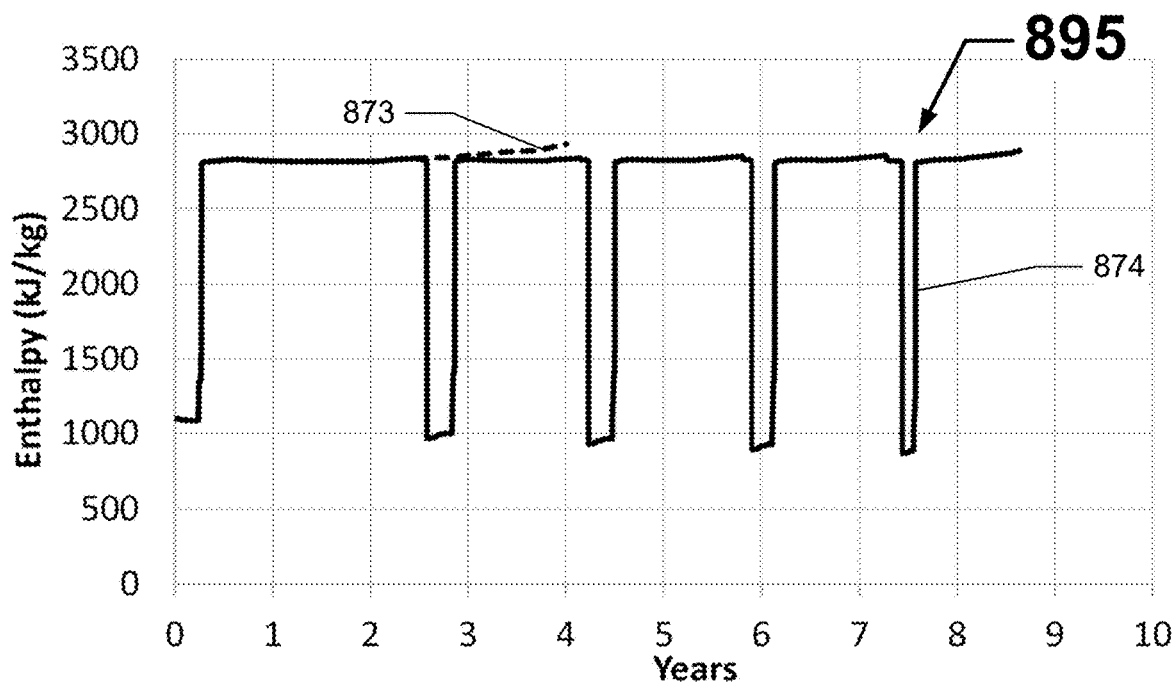
FIG. 8 shows a graph of enthalpies of the low permeability geothermal resource over time for the production of low permeability geothermal resources shown in the graph of FIG. 5.

FIG. 8 shows a graph 895 of enthalpies of the low permeability geothermal resource over time for the production of low permeability geothermal resources shown in the graph 598 of FIG. 5. Referring to FIGS. 1A through 8, the graph 895 shows two plots of enthalpy (along the vertical axis in units of kJ/kg) of the low permeability geothermal resource versus time (along the horizontal axis in units of years). Plot 873, shown in dashed line, represents the enthalpy of the low permeability geothermal resource that surrounds the wellbore 220 using example embodiments that do not include a fluid injection system 230 to periodically (cyclically) resaturate the low permeability rock matrix. Plot 874, shown in solid line, represents the enthalpy of the low permeability geothermal resource that surrounds the wellbore 220 using example embodiments that do include a fluid injection system 230 to periodically (cyclically) resaturate the low permeability rock matrix.

In plot 873, the enthalpy of the low permeability geothermal resource gradually increases from approximately 2800 kJ/kg to approximately 2900 kJ/kg from 0.2 years until about 4.0 years, which coincides with when the production of the low permeability rock matrix in the volume 290 that encompasses the wellbore 220 ends using example embodiments that do not include a fluid injection system 230, as shown in the plot 562 of the graph 598 of FIG. 5. This increase in enthalpy is an indication of superheat.

In plot 874, the enthalpy is approximately 1000 kJ/kg during the times that coincide with segment 567-1, segment 567-2, segment 567-3, and segment 567-4, and also before the start of segment 565-1, in the plot 561 of the graph 598 of FIG. 5. The enthalpy in the plot 874 also is approximately 2800 kJ/kg to approximately 2900 kJ/kg from 0.2 years until about 8.7 years, which coincides with when the pressure in the wellbore 220 falls to substantially zero, as shown in the plot 561 of the graph 598 of FIG. 5.

Figure 9:
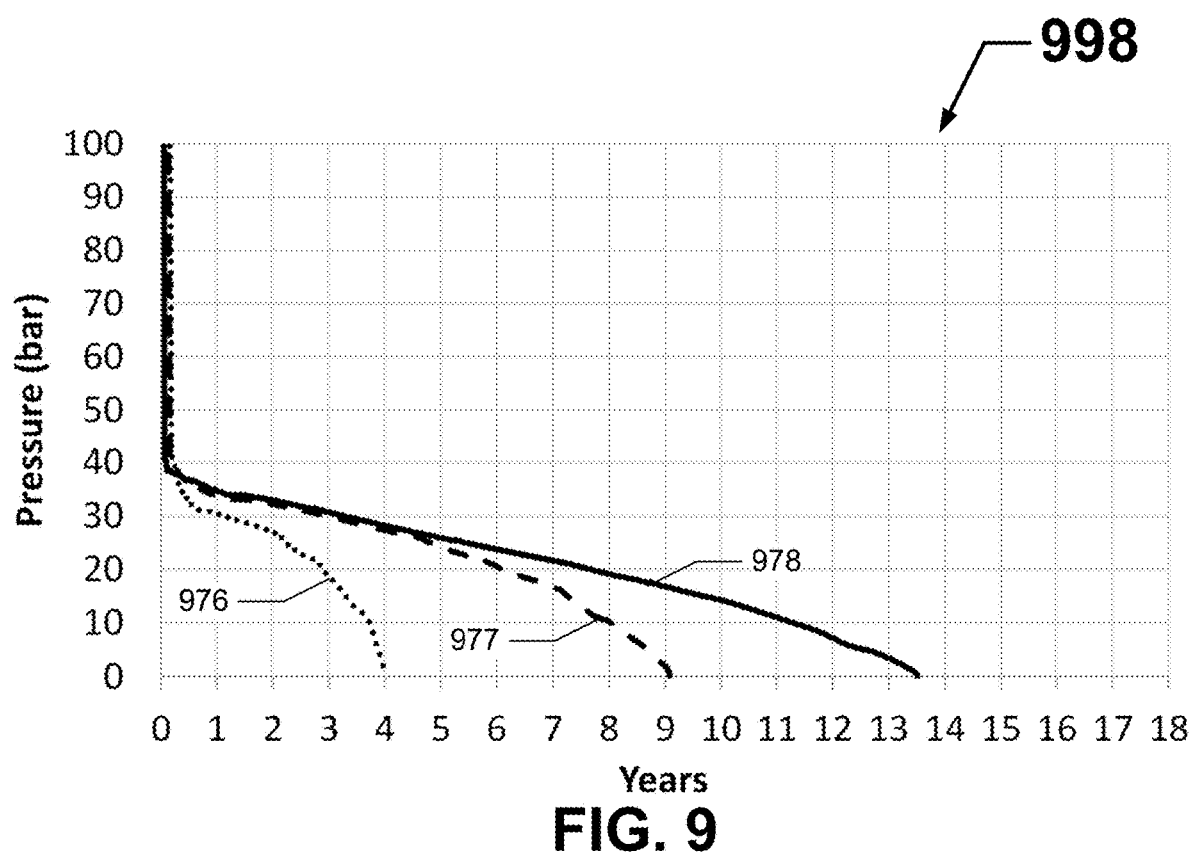
FIG. 9 shows a graph of pressures in a low permeability geothermal resource based on different fracture spacing in the low permeability geothermal resource according to certain example embodiments.

FIG. 9 shows a graph 998 of pressures in a low permeability geothermal resource based on different fracture spacing in the low permeability geothermal resource according to certain example embodiments. Referring to FIGS. 1A through 9, the graph 998 shows three plots of pressure (along the vertical axis in units of bar) of the low permeability geothermal resource versus time (along the horizontal axis in units of years). Plot 976, shown in dotted line, represents the pressure in the wellbore adjacent to the low permeability geothermal resource when the spacing (e.g., distance 192) between fractures 101 is approximately 25 meters and the low permeability geothermal resource is produced using the fluid removal system 240 and the heated fluid collection system 250, but without using the fluid injection system 230 discussed above with respect to FIG. 2.

Plot 977, shown in dashed line, represents the pressure in the wellbore adjacent to the low permeability geothermal resource when the spacing (e.g., distance 192) between fractures 101 is approximately 11.7 meters and the low permeability geothermal resource is produced using the fluid removal system 240 and the heated fluid collection system 250, but without using the fluid injection system 230 discussed above with respect to FIG. 2. Plot 978, shown in solid line, represents the pressure in the wellbore adjacent to the low permeability geothermal resource when the spacing (e.g., distance 192) between fractures 101 is approximately 5.33 meters and the low permeability geothermal resource is produced using the fluid removal system 240 and the heated fluid collection system 250, but without using the fluid injection system 230 discussed above with respect to FIG. 2.

If the minimum pressure required to maintain production of the low permeability geothermal resource is 10 bar, then plot 976 shows that, with the widest of the three distances 192 between fractures 101, the pressure threshold is met at approximately 3.7 years, and the pressure in the wellbore 220 is completely diminished at approximately 4.0 years. For plot 977, with the distance 192 between fractures 101 reduced to 11.7 meters, the pressure threshold is met at approximately 8.0 years, and the pressure in the wellbore 220 is completely diminished at approximately 9.1 years. For plot 978, with the distance 192 between fractures 101 reduced to 5.33 meters, the pressure threshold is met at approximately 11.2 years, and the pressure in the wellbore 220 is completely diminished at approximately 13.5 years. As stated above, without using the fluid injection system 230, there is no cyclic production of the low permeability geothermal resource because the rock matrix within the volume 290 is not resaturated (recharged), particularly before reaching the pressure threshold.

Figure 10:
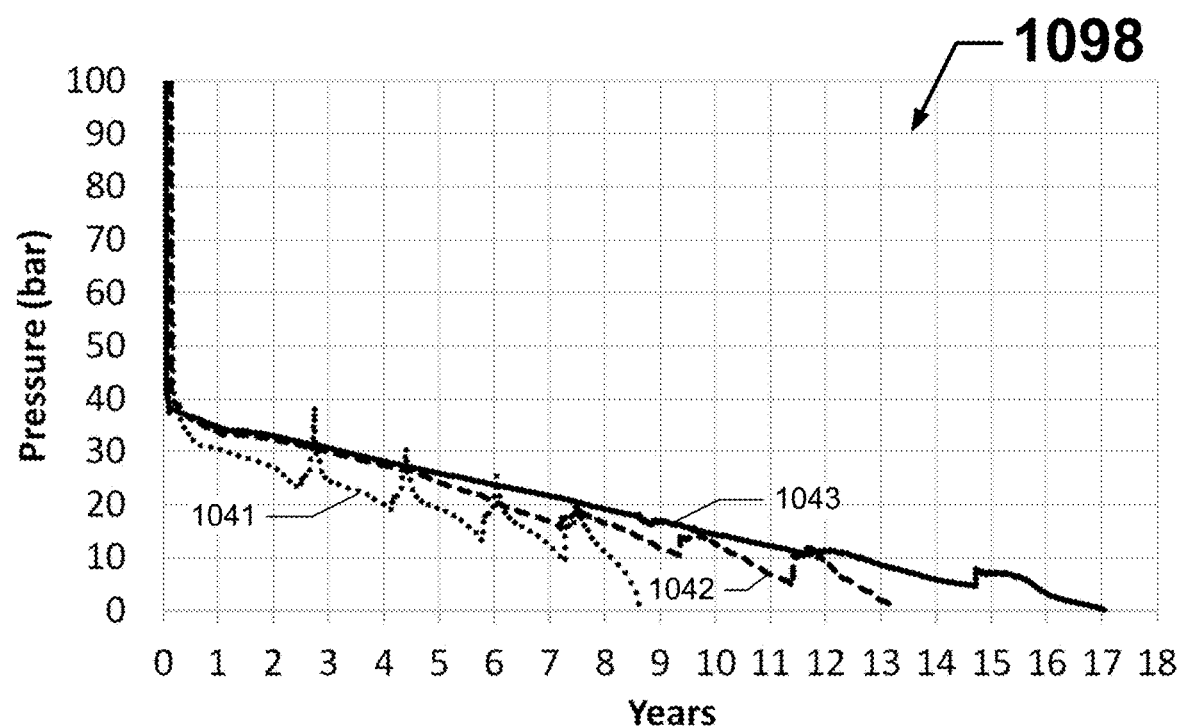
FIG. 10 shows another graph of pressures in a low permeability geothermal resource based on different fracture spacing in the low permeability geothermal resource according to certain example embodiments.

FIG. 10 shows another graph 1098 of pressures in a low permeability geothermal resource based on different fracture spacing in the low permeability geothermal resource according to certain example embodiments. Referring to FIGS. 1A through 10, the graph 1098 shows three plots of pressure (along the vertical axis in units of bar) of the low permeability geothermal resource versus time (along the horizontal axis in units of years). While the plots in the graph 998 of FIG. 9 do not have cyclic production of the low permeability geothermal resource because the fluid injection system 230 is not included in the system 200, the plots in the graph 1098 of FIG. 10 do have cyclic production of the low permeability geothermal resource because the fluid injection system 230 is included, along with the fluid removal system 240 and the heated fluid collection system 250, in the system 200.

Plot 1041, shown in dotted line, represents the pressure in the wellbore adjacent to the low permeability geothermal resource when the spacing (e.g., distance 192) between fractures 101 is approximately 25 meters and the low permeability geothermal resource is produced using example embodiments that include a fluid injection system 230. Plot 1042, shown in dashed line, represents the pressure in the wellbore adjacent to the low permeability geothermal resource when the spacing (e.g., distance 192) between fractures 101 is approximately 11.7 meters and the low permeability geothermal resource is produced using example embodiments that include a fluid injection system 230. Plot 1043, shown in solid line, represents the pressure in the wellbore adjacent to the low permeability geothermal resource when the spacing (e.g., distance 192) between fractures 101 is approximately 5.33 meters and the low permeability geothermal resource is produced using example embodiments that include a fluid injection system 230. The low permeability geothermal resource in FIG. 10 is the same as the low permeability geothermal resource for the plots in the graph 998 in FIG. 9.

If the minimum pressure required to maintain production of the low permeability geothermal resource is 10 bar, then plot 1041 shows that, with the widest of the three distances 192 between fractures 101, and after executing 4 cycles, the pressure threshold is met at approximately 8.1 years, and the pressure in the wellbore 220 is completely diminished at approximately 8.6 years. For plot 1042, with the distance 192 between fractures 101 reduced to 11.7 meters, and after executing 3 cycles, the pressure threshold is met at approximately 11.9 years, and the pressure in the wellbore 220 is completely diminished at approximately 13.3 years. For plot 1043, with the distance 192 between fractures 101 reduced to 5.33 meters, and after executing 1 cycle, the pressure threshold is met at approximately 13.0 years, and the pressure in the wellbore 220 is completely diminished at approximately 17.1 years.

Based on the data shown in FIGS. 9 and 10, using example embodiments that include a fluid injection system 230 to periodically resaturate the rock matrix of the low permeability geothermal resource with a distance 192 between fractures 101 equal to 25 meters can extend the production of the low permeability geothermal resource by over 129% compared to example embodiments that do not include a fluid injection system 230 to periodically resaturate the rock matrix of the low permeability geothermal resource. Also, using example embodiments that include a fluid injection system 230 to periodically resaturate the rock matrix of the low permeability geothermal resource with a distance 192 between fractures 101 equal to 11.7 meters can extend the production of the low permeability geothermal resource by over 31% compared to example embodiments that do not include a fluid injection system 230 to periodically resaturate the rock matrix of the low permeability geothermal resource. Finally, using example embodiments that include a fluid injection system 230 to periodically resaturate the rock matrix of the low permeability geothermal resource with a distance 192 between fractures 101 equal to 5.33 meters can extend the production of the low permeability geothermal resource by over 11% compared to example embodiments that do not include a fluid injection system 230 to periodically resaturate the rock matrix of the low permeability geothermal resource.

In cases where the distance 192 is relatively large (e.g., 25 meters), the fluid travels longer distances from the rock matrix to the fractures 101. Reducing the distance 192 reduces the distance that the fluid travels from the rock matrix to the fractures 101. The benefit of executing iterative cycles using example embodiments that include a fluid injection system 230 (as opposed to only using a fluid extraction system 240 and a heated fluid collection system 250) is reduced when the distance 192 between fractures 101 is made smaller. The distance 192 between fractures 101 can be reduced by using smaller cluster spacing in well completion.

Figure 11:
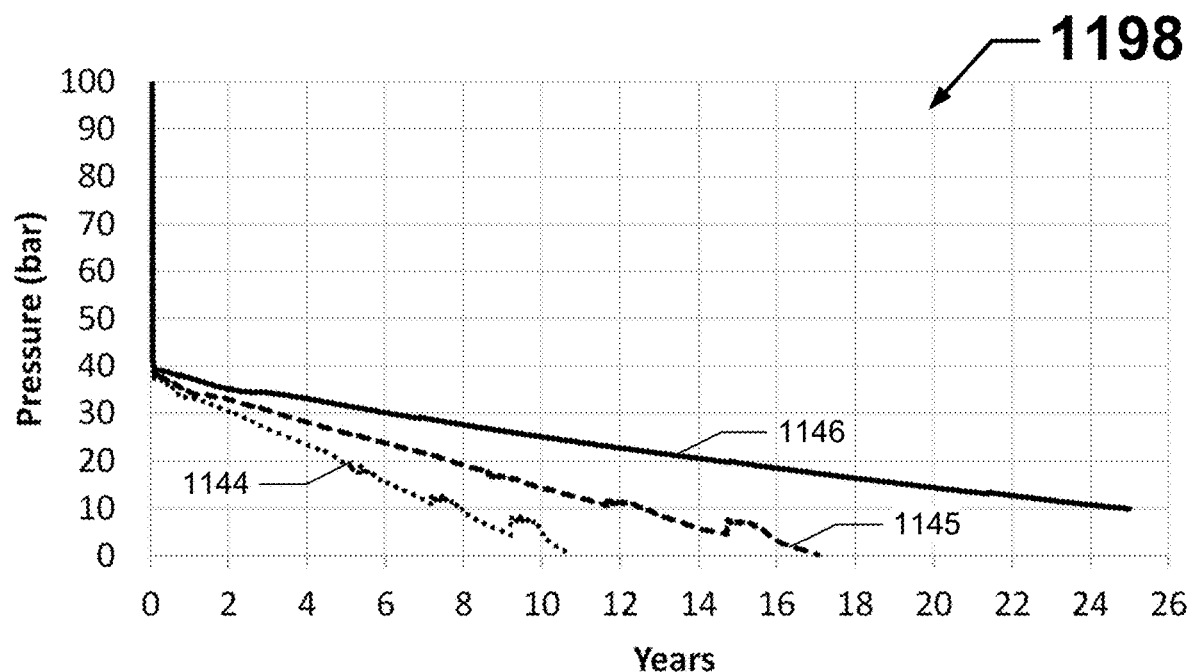
FIG. 11 shows a graph of pressures in a low permeability geothermal resource to produce steam for a thermal electric generator according to certain example embodiments.
Figure 12:
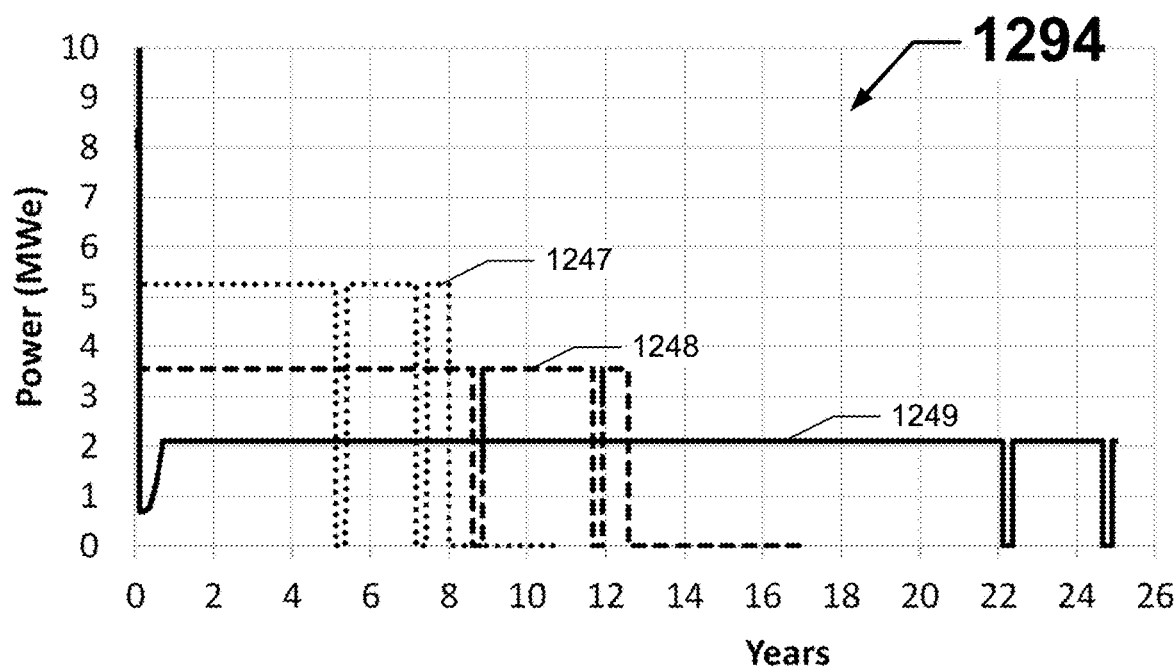
FIG. 12 shows generator capacities using steam produced from a low permeability geothermal resource according to certain example embodiments.

FIG. 11 shows a graph 1198 of pressures in a low permeability geothermal resource to produce steam for a thermal electric generator according to certain example embodiments. FIG. 12 shows a graph 1294 of generator capacities using steam produced from a low permeability geothermal resource according to certain example embodiments. Referring to FIGS. 1A through 12, the graph 1198 and the graph 1294 both assume that the distance 192 between fractures 101 in the volume 290 that encompasses a wellbore 220 is 5.33 meters. The graph 1198 of FIG. 11 shows three plots of pressure (along the vertical axis in units of bar) of the low permeability geothermal resource versus time (along the horizontal axis in units of years).

Plot 1144, shown in dotted line, represents the pressure in the wellbore disposed within the low permeability geothermal resource corresponding to a flow rate required to power an electric generator (a type of heated fluid consumption source 275) with a capacity of 5.0 MW using example embodiments. Plot 1145, shown in dashed line, represents the pressure in the wellbore disposed within the low permeability geothermal resource corresponding to a flow rate required to power an electric generator with a capacity of 3.5 MW using example embodiments. Plot 1146, shown in solid line, represents the pressure in the wellbore disposed within the low permeability geothermal resource corresponding to a flow rate required to power an electric generator with a capacity of 2.1 MW using example embodiments.

If the minimum pressure required to maintain production of the low permeability geothermal resource is 10 bar, then plot 1144 shows that after executing 3 cycles, the pressure threshold is met at approximately 10.0 years, and the pressure in the wellbore 220 is completely diminished at approximately 10.7 years. For plot 1145, after executing 3 cycles, the pressure threshold is met at approximately 16.0 years, and the pressure in the wellbore 220 is completely diminished at approximately 17.1 years. For plot 1146, after executing 3 cycles, the pressure threshold is met at approximately 25.0 years.

The graph 1294 of FIG. 12 shows three plots of power output (along the vertical axis in units of MWe) for the generators referenced in FIG. 11 versus time (along the horizontal axis in units of years). Plot 1247, in dotted line, shows a steady power output of 5.2 MW from 0 years to 8 years, with 2 small periods of time, coinciding with when the rock matrix of the low permeability geothermal resource is resaturated (segment 567 of a cycle), where the power output is substantially zero. After 8 years, the low permeability geothermal resource no longer produces, and so the power output after that time is substantially zero. Plot 1248, in dashed line, shows a steady power output of 3.5 MW from 0 years to 12.7 years, with 2 small periods of time, coinciding with when the rock matrix of the low permeability geothermal resource is resaturated (segment 567 of a cycle), where the power output is substantially zero. After 12.7 years, the low permeability geothermal resource no longer produces, and so the power output after that time is substantially zero. Plot 1249, in solid line, shows a steady power output of 2.1 MW from 0 years to 25 years, with 2 small periods of time, coinciding with when the rock matrix of the low permeability geothermal resource is resaturated (segment 567 of a cycle), where the power output is substantially zero.

In some cases, a large low permeability geothermal resource can be operated by producing at a larger flow rate from a wellbore 220, and at a later time, before the wellbore 220 is depleted, one or more additional wellbores 220 into the low permeability geothermal resource can be drilled as makeup wells. These one or more additional wellbores 220 can then be produced to compensate for the original wellbore 220 being depleted. Such strategies can also be used to collect a larger overall flow rate of heated fluid and/or to extend the period of time in which a flow rate of heated fluid can be collected.

Figure 13:
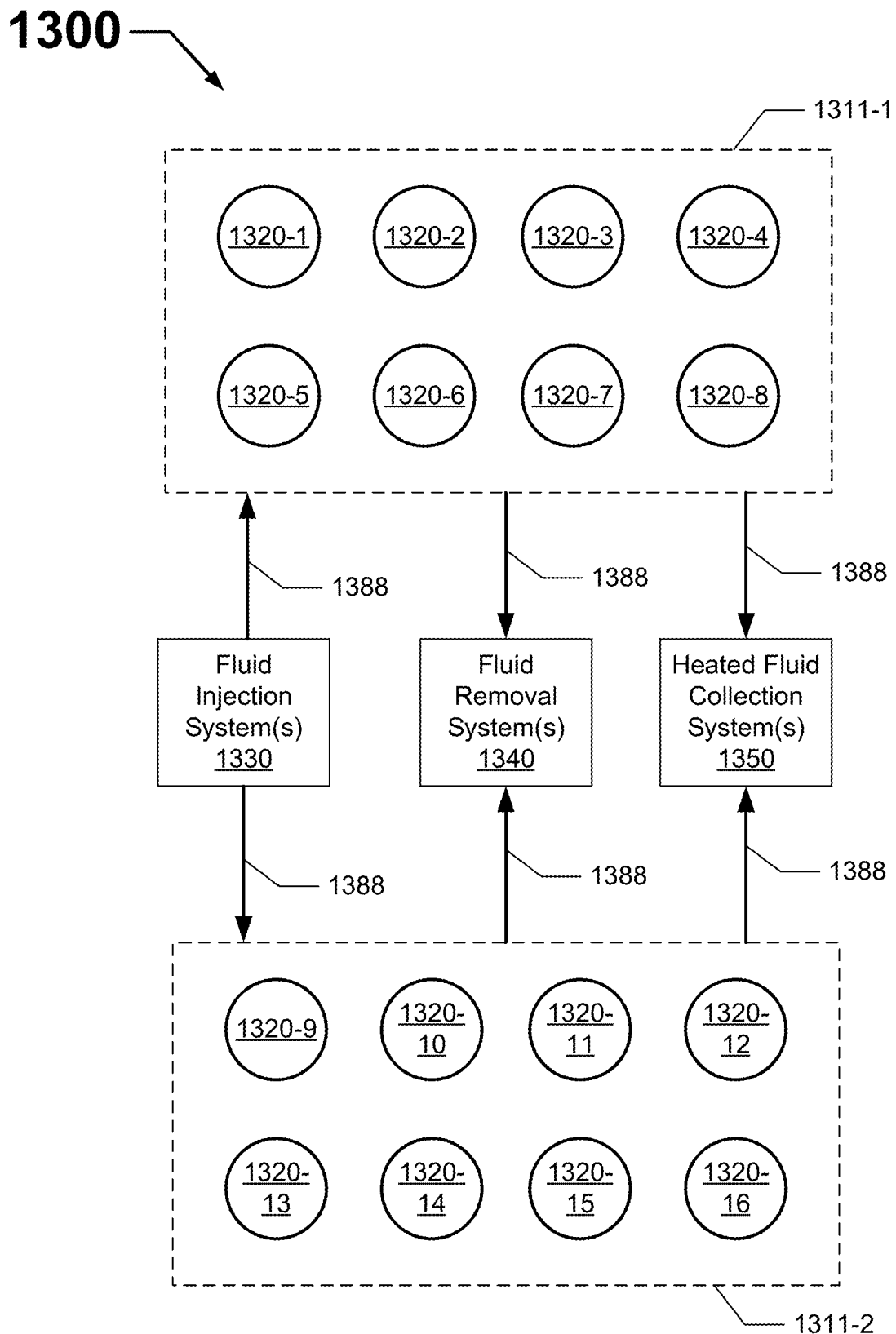
FIG. 13 shows a system diagram with one or more pads according to certain example embodiments.

FIG. 13 shows a diagram of a system 1300 with one or more pads 1311 according to certain example embodiments. Referring to FIGS. 1A through 13, the system 1300 includes two pads 1311. Pad 1311-1 has 8 wellbores 1320 (wellbore 1320-1, wellbore 1320-2, wellbore 1320-3, wellbore 1320-4, wellbore 1320-5, wellbore 1320-6, wellbore 1320-7, and wellbore 1320-8), and pad 1311-2 also has 8 other wellbores 1320 (wellbore 1320-9, wellbore 1320-10, wellbore 1320-

11, wellbore 1320-12, wellbore 1320-13, wellbore 1320-14, wellbore 1320-15, and wellbore 1320-16).

The system 1300 can also include one or more fluid injection systems 1330, one or more fluid removal systems 1340, and one or more heated fluid collection systems 1350. The remaining components of the system 200 of FIG. 2 are not shown here for the sake of simplicity, but they can be included as part of the system 1300 of FIG. 13. As indicated in FIG. 2 above, and as is the case here, a single fluid injection system 1330, a single fluid removal system 1340, and/or a single heated fluid collection system 1350 (including associated piping 1388) can be used for multiple wellbores 1320. Also, the low permeability geothermal resources of multiple wellbores 1320 can be produced at the same time using example embodiments. The piping 1388, the wellbores 1320, the single fluid injection system 1330, the single fluid removal system 1340, and the single heated fluid collection system 1350 of the system 1300 of FIG. 13 can be substantially the same as the corresponding components discussed above.

In some cases, as when there is underground hydraulic communication between adjacent wellbores 1320, the low permeability geothermal resources of those wellbores 1320 can be produced simultaneously, but in such a case the segments of each cycle using example embodiments should be coincident with each other. If not, then there is a risk that a collapse in pressure in the volumes (e.g., volumes 290) surrounding those wellbores 1320. For example, if one wellbore 1320 (e.g., wellbore 1320-4) is in a segment 567 where relatively lower temperature fluid is injected into the wellbore 1320 while an adjacent wellbore 1320 (e.g., wellbore 1320-8) is in a segment 566 where heated fluid is being collected from that wellbore 1320, the mixture of drastic temperatures can cause a pressure collapse, as well as a potentially unwanted change to the rock matrices within the volumes 290.

On the other hand, if there is no underground hydraulic communication between adjacent wellbores 1320, the low permeability geothermal resources of those wellbores 1320 can be produced simultaneously where the segments between the two can be staggered with respect to each other. In this way, a more consistent flow of heated fluid can be collected by producing the low permeability geothermal resources of multiple wellbores 1320 on staggered segments. Put another way, by staggering the segments of the production of low permeability geothermal resources of multiple wellbores that do not have underground hydraulic communication between them, heated fluid can be collected (corresponding to segment 566) from one wellbore 1320 while fluid is being injected (corresponding to segment 567) into another wellbore 1320 at a given point in time. Determining whether adjacent wellbores 1320 have underground hydraulic communication between them can be done using any of a number of testing methods (e.g., pressure monitoring) known in the art.

Often, multiple wellbores 1320 (e.g., wellbore 1320-1 through wellbore 1320-8) drilled from a common pad 1311 (e.g., pad 1311-1) are drilled and completed in such a way that there is underground hydraulic communication between those wellbores 1320. To the extent that such a case exists, one or more additional pads 1311 (e.g., pad 1311-2) can be developed so that the wellbores 1320 (e.g., wellbore 1320-9 through wellbore 1320-16) of those one or more additional pads have no underground hydraulic communication with the wellbores 1320 of the first pad 1311.

In any case, having multiple wellbores 1320, either in the same pad 1311 (e.g., pad 1311-1) or in different pads 1311 (e.g., pad 1311-1 and pad 1311-2), with low permeability geothermal resources that can be produced offers operating flexibility. For example, by producing the low permeability geothermal resources for multiple wellbores 1320 simultaneously, different scenarios can be utilized for the heated fluid collected from those wellbores 1320. As an example, if example embodiments are used to produce the low permeability geothermal resources of 5 wellbores 1320 at once, enough heated fluid (e.g., steam) can be collected for 10 years each to operate a 2.1 MW electric generator (a total of 10.5 MW) at full capacity for most, if not all, of that entire period.

As another example, if example embodiments are used to produce the low permeability geothermal resources of 3 wellbores 1320 at once for 12 years, followed by 3 other wellbores for another 12 years, enough heated fluid (e.g., steam) can be collected for each 12-year period from each wellbore 1320 to operate a 3.5 MW electric generator (a total of 10.5 MW) at full capacity for most, if not all, of that entire 24-year period.

As still another example, if example embodiments are used to produce the low permeability geothermal resources of 2 wellbores 1320 at once for 8 years, followed by 2 other wellbores for another 8 years, followed by yet another 2 wellbores 1320 for an additional 8 years, enough heated fluid (e.g., steam) can be collected for each 8-year period from each wellbore 1320 to operate a 5 MW electric generator (a total of 10 MW) at full capacity for most, if not all, of that entire 24-year period.

In certain example embodiments, each wellbore 1320 is drilled and completed for the specific purpose of producing the low permeability geothermal resources within the subterranean formation 210. This is particularly true when the subterranean formation 210 has relatively low permeability and medium to high porosity, which are conditions that are not usually conducive for the extraction of certain subterranean resources, such as oil and natural gas. In other cases, as when a dry hole has been drilled through a subterranean formation 210 having relatively low permeability and high porosity, example embodiments can use these pre-existing wellbores 1320. If a pre-existing wellbore 1320 is used with example systems and methods to produce the low permeability geothermal resources in the subterranean formation 210 through which the wellbore 1320 is disposed, then measures may be taken beforehand to ensure that no significant amounts of natural gas and/or other hydrocarbons exist within the volume 290. In some cases, a pre-existing wellbore 1320, whether productive in terms of hydrocarbons or not, can be used to a particular depth (e.g., to a kick-off point), and then a new/continuation wellbore 1320 can be drilled from that point to a different depth and/or direction to reach a volume 290.

Figure 14:
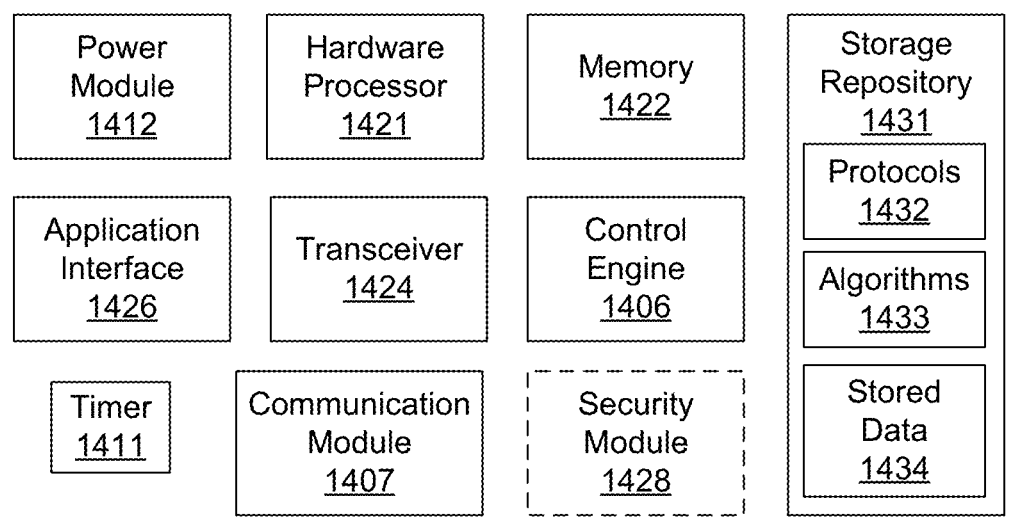
FIG. 14 shows a system diagram of a controller according to certain example embodiments.

FIG. 14 shows a system diagram of a controller 1404 according to certain example embodiments. Referring to FIGS. 1A through 14, the controller 1404 can be substantially the same as a controller 204 discussed above. The controller 1404 includes multiple components. In this case, the controller 1404 of FIG. 14 includes a control engine 1406, a communication module 1407, a timer 1410, a power module 1412, a storage repository 1430, a hardware processor 1421, a memory 1422, a transceiver 1424, an application interface 1426, and, optionally, a security module 1428. The controller 1404 (or components thereof) can be located at or near the pads 1311 and/or the wellbores 1320. In addition, or in the alternative, the controller 1404 (or components thereof) can be located remotely from (e.g., in the cloud, at an office building) the pads 1311 and/or the wellbores 1320.

The storage repository 1431 can be a persistent storage device (or set of devices) that stores software and data used to assist the controller 1404 in communicating with one or more other components of a system, such as the users 251 (including associated user systems 255), each fluid injection system 230, each fluid removal system 240, each heated fluid collection system 250, and the sensor devices 260 of the system 200 of FIG. 2 above. In one or more example embodiments, the storage repository 1431 stores one or more protocols 1432, algorithms 1433, and stored data 1434.

The protocols 1432 of the storage repository 1431 can be any procedures (e.g., a series of method steps) and/or other similar operational processes that the control engine 1406 of the controller 1404 follows based on certain conditions at a point in time. The protocols 1432 can include any of a number of communication protocols that are used to send and/or obtain data between the controller 1404 and other components of a system (e.g., system 200). Such protocols 1432 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 1432 can provide a layer of security to the data transferred within a system (e.g., system 200). Other protocols 1432 used for communication can be associated with the use of Wi-Fi, Zigbee, VLC, cellular networking, Bluetooth Low Energy (BLE), ultrawide band (UWB), and Bluetooth.

The algorithms 1433 can be any formulas, mathematical models, forecasts, simulations, and/or other similar tools that the control engine 1406 of the controller 1404 uses to reach a computational conclusion. For example, one or more algorithms 1433 can be used to assist the controller 1404 to determine when to stop the operation of the fluid removal system 240. As another example, one or more algorithms 1433 can be used to assist the controller 1404 to determine when to start the operation of the fluid injection system 230. As yet another example, one or more algorithms 1433 can be used to assist the controller 1404 to identify a low permeability geothermal resource within a subterranean formation 210. As still another example, one or more algorithms 1433 can be used to assist the controller 1404 to model the produced amount from a low permeability geothermal resource within a subterranean formation 210.

Stored data 1434 can be any data associated with the field (e.g., the wellbores 220, the subterranean formation 210, the volumes 290), other fields (e.g., other wellbores and subterranean formations), the other components (e.g., the user systems 255, the fluid extraction system 240, the heated fluid collection system 250), including associated equipment (e.g., motors, pumps, compressors), of the system 200, measurements made by the sensor devices 260, threshold values, tables, results of previously run or calculated algorithms 1433, updates to protocols 1432, user preferences, and/or any other suitable data. Such data can be any type of data, including but not limited to historical data, present data, and future data (e.g., forecasts). The stored data 1434 can be associated with some measurement of time derived, for example, from the timer 1411.

Examples of a storage repository 1431 can include, but are not limited to, a database (or a number of databases), a file system, cloud-based storage, a hard drive, flash memory, some other form of solid state data storage, or any suitable combination thereof. The storage repository 1431 can be located on multiple physical machines, each storing all or a portion of the communication protocols 1432, the algorithms 1433, and/or the stored data 1434 according to some example embodiments. Each storage unit or device can be physically located in the same or in a different geographic location.

The storage repository 1431 can be operatively connected to the control engine 1406. In one or more example embodiments, the control engine 1406 includes functionality to communicate with the users 251 (including associated user systems 255), the sensor devices 260, and the other components in the system 200. More specifically, the control engine 1406 sends information to and/or obtains information from the storage repository 1431 in order to communicate with the users 251 (including associated user systems 255), the sensor devices 260, and the other components of the system 200. As discussed below, the storage repository 1431 can also be operatively connected to the communication module 1407 in certain example embodiments.

In certain example embodiments, the control engine 1406 of the controller 1404 controls the operation of one or more components (e.g., the communication module 1407, the timer 1411, the transceiver 1424) of the controller 1404. For example, the control engine 1406 can activate the communication module 1407 when the communication module 1407 is in "sleep" mode and when the communication module 1407 is needed to send data obtained from another component (e.g., a sensor device 260) in the system 200. In addition, the control engine 1406 of the controller 1404 can control the operation of one or more other components (e.g., the fluid removal system 240, the heated fluid collection system 250, the optional fluid injection system 230), or portions thereof, of the system 200.

The control engine 1406 of the controller 1404 can communicate with one or more components of the system 200. For example, the control engine 1406 can use one or more protocols 1432 to facilitate communication with the sensor devices 260 to obtain data (e.g., measurements of various parameters, such as temperature, pressure, porosity, and permeability), whether in real time or on a periodic basis and/or to instruct a sensor device 260 to take a measurement.

As another example, the control engine 1406 can have (as stored data 1434 in the storage repository 1431) a three-dimensional layout of the subterranean formation 210, including the location of any volumes 290 therein that have the desired amount of permeability and porosity. If a wellbore 220 has been drilled and completed in the subterranean formation 210, any available information associated with the wellbore 220 can also be stored as stored data 1434. The control engine 1406 can use this information, as well as one or more protocols 1432 and/or algorithms 1433 to analyze the performance of each subsystem (e.g., the fluid removal system 240, the heated fluid collection system 250, the optional fluid injection system 230) in the system 200 while producing the low permeability geothermal resource within a volume 290. As yet another example, the control engine 1406 can use one or more algorithms 1433 and/or protocols 1432 to further process all of the data obtained from the sensor devices 260 to recommend actions to take at different points in time to optimize or enhance the production of the low permeability geothermal resource.

The control engine 1406 can generate and process data associated with control, communication, and/or other signals sent to and obtained from the users 251 (including associated user systems 255), the sensor devices 260, and the other components of the system 200. In certain embodiments, the control engine 1406 of the controller 1404 can communicate with one or more components of a system external to the system 200. For example, the control engine 1406 can interact with an inventory management system by ordering replacements for components or pieces of equipment (e.g., a sensor device 260, a valve 285, a motor) within the system 200 that has failed or is failing. As another example, the control engine 1406 can interact with a contractor or workforce scheduling system by arranging for the labor needed to replace a component or piece of equipment in the system 200. In this way and in other ways, the controller 1404 is capable of performing a number of functions beyond what could reasonably be considered a routine task.

In certain example embodiments, the control engine 1406 can include an interface that enables the control engine 1406 to communicate with the sensor devices 260, the user systems 255, and the other components of the system 200. For example, if a user system 255 operates under IEC Standard 62386, then the user system 255 can have a serial communication interface that will transfer data to the controller 1404. Such an interface can operate in conjunction with, or independently of, the communication protocols 1432 used to communicate between the controller 1404 and the users 251 (including corresponding user systems 255), the sensor devices 260, and the other components of the system 200.

The control engine 1406 (or other components of the controller 1404) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The communication module 1407 of the controller 1404 determines and implements the communication protocol (e.g., from the protocols 1432 of the storage repository 1431) that is used when the control engine 1406 communicates with (e.g., sends signals to, obtains signals from) the user systems 255, the sensor devices 260, and the other components of the system 200. In some cases, the communication module 1407 accesses the stored data 1434 to determine which communication protocol is used to communicate with another component of the system 200. In addition, the communication module 1407 can identify and/or interpret the communication protocol of a communication obtained by the controller 1404 so that the control engine 1406 can interpret the communication. The communication module 1407 can also provide one or more of a number of other services with respect to data sent from and obtained by the controller 1404. Such services can include, but are not limited to, data packet routing information and procedures to follow in the event of data interruption.

The timer 1411 of the controller 1404 can track clock time, intervals of time, an amount of time, and/or any other measure of time. The timer 1411 can also count the number of occurrences of an event, whether with or without respect to time. Alternatively, the control engine 1406 can perform the counting function. The timer 1411 is able to track multiple time measurements and/or count multiple occurrences concurrently. The timer 1411 can track time periods based on an instruction obtained from the control engine 1406, based on an instruction obtained from a user 251, based on an instruction programmed in the software for the controller 1404, based on some other condition (e.g., the occurrence of an event) or from some other component, or from any combination thereof. In certain example embodiments, the timer 1411 can provide a time stamp for each packet of data obtained from another component (e.g., a sensor device 260) of the system 200.

The power module 1412 of the controller 1404 obtains power from a power supply (e.g., AC mains) and manipulates (e.g., transforms, rectifies, inverts) that power to provide the manipulated power to one or more other components (e.g., the timer 1410, the control engine 1406) of the controller 1404, where the manipulated power is of a type (e.g., alternating current, direct current) and level (e.g., 12V, 24V, 120V) that can be used by the other components of the controller 1404. In some cases, the power module 1412 can provide power to one or more of the sensor devices 260.

The power module 1412 can include one or more of a number of single or multiple discrete components (e.g., transistor, diode, resistor, transformer), and/or a microprocessor. The power module 1412 may include a printed circuit board, upon which the microprocessor and/or one or more discrete components are positioned. In addition, or in the alternative, the power module 1412 can be a source of power in itself to provide signals to the other components of the controller 1404. For example, the power module 1412 can be or include an energy storage device (e.g., a battery). As another example, the power module 1412 can be or include a localized photovoltaic power system.

The hardware processor 1421 of the controller 1404 executes software, algorithms (e.g., algorithms 1433), and firmware in accordance with one or more example embodiments. Specifically, the hardware processor 1421 can execute software on the control engine 1406 or any other portion of the controller 1404, as well as software used by the users 251 (including associated user systems 255) and/or other components of the system 200. The hardware processor 1421 can be an integrated circuit, a central processing unit, a multi-core processing chip, SoC, a multi-chip module including multiple multi-core processing chips, or other hardware processor in one or more example embodiments. The hardware processor 1421 can be known by other names, including but not limited to a computer processor, a microprocessor, and a multi-core processor.

In one or more example embodiments, the hardware processor 1421 executes software instructions stored in memory 1422. The memory 1422 includes one or more cache memories, main memory, and/or any other suitable type of memory. The memory 1422 can include volatile and/or non-volatile memory. The memory 1422 can be discretely located within the controller 1404 relative to the hardware processor 1421. In certain configurations, the memory 1422 can be integrated with the hardware processor 1421.

In certain example embodiments, the controller 1404 does not include a hardware processor 1421. In such a case, the controller 1404 can include, as an example, one or more field programmable gate arrays (FPGA), one or more insulated-gate bipolar transistors (IGBTs), one or more integrated circuits (ICs). Using FPGAs, IGBTs, ICs, and/or other similar devices known in the art allows the controller 1404 (or portions thereof) to be programmable and function according to certain logic rules and thresholds without the use of a hardware processor. Alternatively, FPGAs, IGBTs, ICs, and/or similar devices can be used in conjunction with one or more hardware processors 1421.

The transceiver 1424 of the controller 1404 can send and/or obtain control and/or communication signals. Specifically, the transceiver 1424 can be used to transfer data between the controller 1404 and the users 251 (including associated user systems 255), the sensor devices 260, and the other components of the system 200. The transceiver 1424 can use wired and/or wireless technology. The transceiver 1424 can be configured in such a way that the control and/or communication signals sent and/or obtained by the transceiver 1424 can be obtained and/or sent by another transceiver that is part of a user system 255, a sensor device 260, and/or another component of the system 200. The transceiver 1424 can send and/or obtain any of a number of signal types, including but not limited to radio frequency signals.

When the transceiver 1424 uses wireless technology, any type of wireless technology can be used by the transceiver 1424 in sending and obtaining signals. Such wireless technology can include, but is not limited to, Wi-Fi, Zigbee, VLC, cellular networking, BLE, UWB, and Bluetooth. The transceiver 1424 can use one or more of any number of suitable communication protocols (e.g., ISA100, HART) when sending and/or obtaining signals.

Optionally, in one or more example embodiments, the security module 1428 secures interactions between the controller 1404, the users 251 (including associated user systems 255), the sensor devices 260, and the other components of the system 200. More specifically, the security module 1428 authenticates communication from software based on security keys verifying the identity of the source of the communication. For example, user software may be associated with a security key enabling the software of a user system 255 to interact with the controller 1404. Further, the security module 1428 can restrict receipt of information, requests for information, and/or access to information.

A user 251 (including an associated user system 255), the sensor devices 260, and the other components of the system 200 can interact with the controller 1404 using the application interface 1426 in accordance with one or more example embodiments. Specifically, the application interface 1426 of the controller 1404 obtains data (e.g., information, communications, instructions, updates to firmware) from and sends data (e.g., information, communications, instructions) to the user systems 255 of the users 251, the sensor devices 260, and/or the other components of the system 200. Examples of an application interface 1426 can be or include, but are not limited to, an application programming interface, a web service, a data protocol adapter, some other hardware and/or software, or any suitable combination thereof. Similarly, the user systems 255 of the users 251, the sensor devices 260, and/or the other components of the system 200 can include an interface (similar to the application interface 1426 of the controller 1404) to obtain data from and send data to the controller 1404 in certain example embodiments.

In addition, as discussed above with respect to a user system 255 of a user 251, one or more of the sensor devices 260 and/or one or more of the other components of the system 200 can include a user interface. Examples of such a user interface can include, but are not limited to, a graphical user interface, a touchscreen, a keyboard, a monitor, a mouse, some other hardware, or any suitable combination thereof.

The controller 1404, the users 251 (including associated user systems 255), the sensor devices 260, and the other components of the system 200 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 1404. Examples of such a system can include, but are not limited to, a desktop computer with a LAN, a WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 3.

Further, as discussed above, such a system can have corresponding software (e.g., user system software, sensor device software, controller software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 200.

In certain example embodiments, one or more models (types of algorithms 1433) can be used to find a potential low permeability geothermal resource in a subterranean formation 210 and/or to control the production of a low permeability geothermal resource. Such algorithms 1433 can be built independently or can be integrated into one or more existing algorithms 1433 (e.g., models used for multi-fractured horizontal wells). The methods set forth in FIGS. 15 and 16 show examples of how such algorithms can be used in example embodiments.

The models (algorithms 1433) used in example embodiments can have any of a number of inputs. For example, some inputs can be the initial temperature (e.g., 250° C.) and pressure (e.g., 568 bar) of the volume 290 within the subterranean formation 210. Examples of inputs for the rock matrix can include, but are not limited to, density (e.g., 2600.0 kg/m$^3$), porosity (e.g., 0.05), x-permeability (e.g., $1.0 \times 10^{-18}$ m$^2$), y-permeability (e.g., $1.0 \times 10^{-18}$ m$^2$), z-permeability (e.g., $1.0 \times 10^{-18}$ m$^2$), wet heat conductivity (e.g., 2.0 W/(m ° K), and specific heat (e.g., 1000.0 J(kg ° K). Examples of inputs for fracture material can include, but are not limited to, density (e.g., 2600.0 kg/m$^3$), porosity (e.g., 0.5), x-permeability (e.g., $1.0 \times 10^{-10}$ m$^2$), y-permeability (e.g., $1.0 \times 10^{-10}$ m$^2$), z-permeability (e.g., $1.0 \times 10^{-10}$ m$^2$), wet heat conductivity (e.g., 2.0 W/(m ° K), and specific heat (e.g., 1000.0 J(kg ° K).

Figure 15:
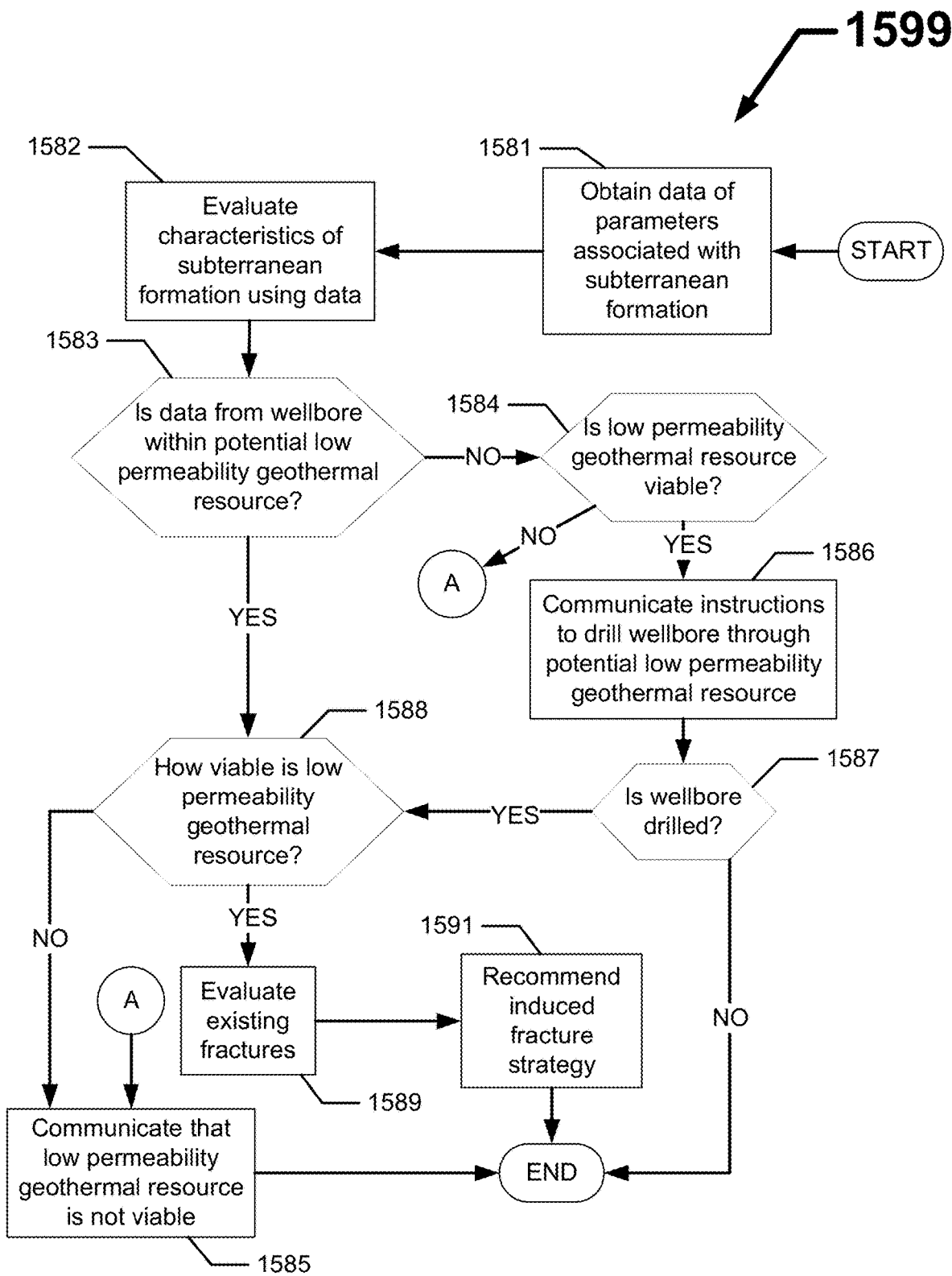
FIG. 15 shows a flowchart of a method for identifying a low permeability geothermal resource within a subterranean formation according to certain example embodiments.
Figure 16:
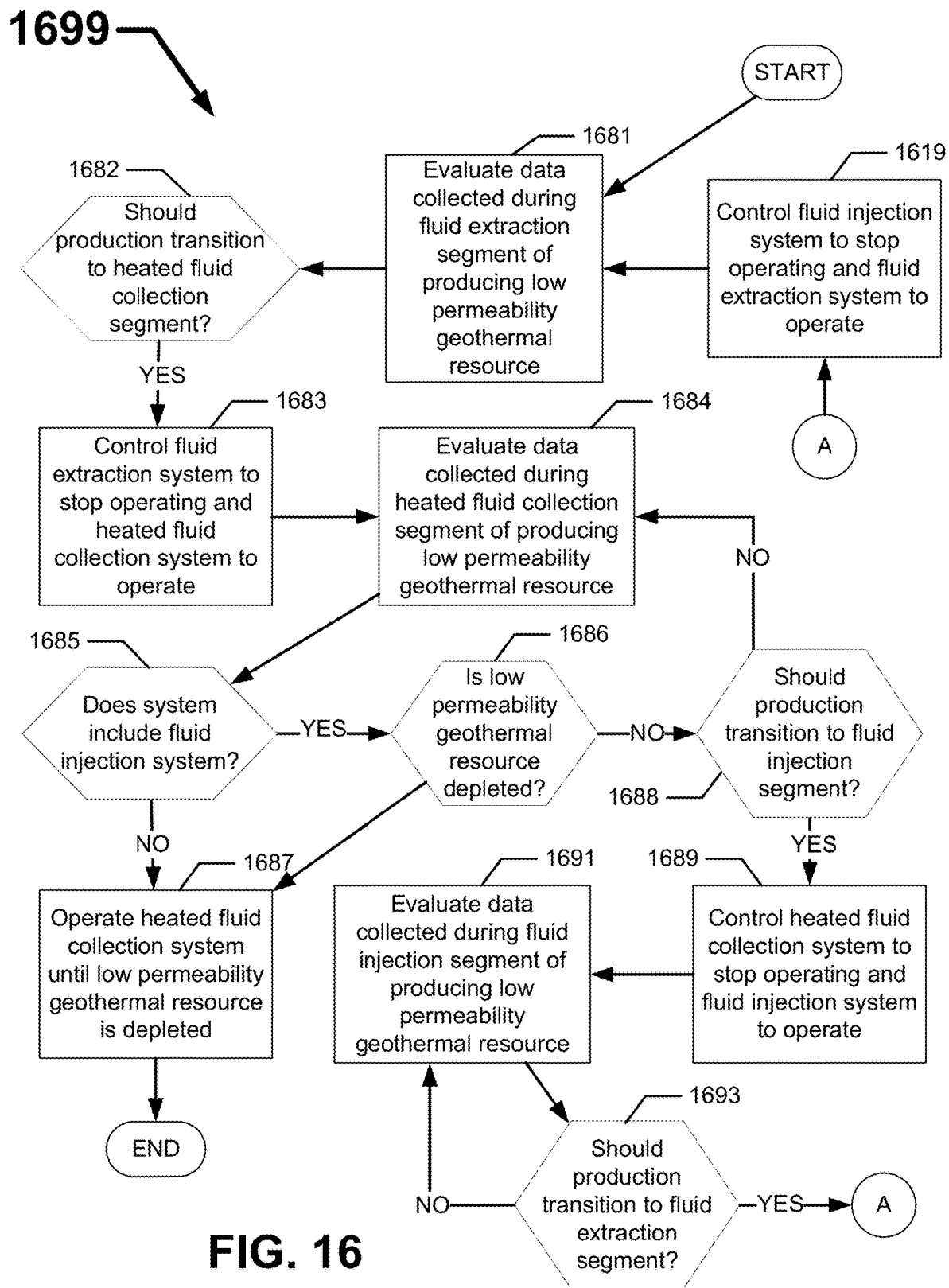
FIG. 16 shows a flowchart of a method for operating the production of a low permeability geothermal resource according to certain example embodiments.

FIG. 15 shows a flowchart 1599 of a method for identifying a low permeability geothermal resource within a subterranean formation according to certain example embodiments. While the various steps in this flowchart 1599 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 15 may be included in performing this method. Accordingly, the specific arrangement of steps should not be construed as limiting the scope. Further, a particular computing device, such as the computing device discussed above with respect to FIG. 5, can be used to perform one or more of the steps for the methods shown in FIG. 15 in certain example embodiments. Any of the functions performed below by the controller 404 can involve the use of one or more protocols, one or more algorithms, and/or stored data stored in a storage repository.

The method shown in FIG. 15 is merely an example that can be performed by using an example system described herein. In other words, systems for producing a low permeability geothermal resource can perform other functions using other methods in addition to and/or aside from those shown in FIG. 15. Referring to FIGS. 1A through 15, the method shown in the flowchart 1599 of FIG. 15 begins at the START step and proceeds to step 1581, where data of parameters associated with a subterranean formation 210 are obtained. As used herein, the term "obtaining" may include receiving, retrieving, accessing, generating, etc. or any other manner of obtaining data. The data can be obtained by a controller 204 (or an obtaining component thereof), which can include the controller 1404 of FIG. 14 above. The data can be obtained from one or more sensor devices 260 that measure various parameters. Examples of such parameters can include, but are not limited to, temperature, pressure, rock type, permeability, and porosity. The data can be obtained continuously (e.g., in real time), periodically, or some other basis. The data can be currently obtained data. In addition, or in the alternative, the data can be historical (e.g., data obtained from a prior field operation of the subterranean formation 210). In such a case, the data can be obtained from a user system 255.

In step 1582, one or more characteristics of the subterranean formation are evaluated using the data. The characteristics can be evaluated by the controller 204 (or an evaluating component thereof) using one or more protocols 1432 and/or algorithms 1433. The characteristics can include, but are not limited to the identification of any potential low permeability geothermal resources in the subterranean formation, the size (e.g., volume) of such potential low permeability geothermal resources, the permeability of such potential low permeability geothermal resources, the porosity of such potential low permeability geothermal resources, the depth of such potential low permeability geothermal resources, and the rock formations between the surface 108 and the potential low permeability geothermal resources.

In step 1583, a determination is made as to whether the data is from a wellbore 220 within a potential low permeability geothermal resource. In other words, has any of the data been measured within the subterranean formation 210 at or near the potential low permeability geothermal resource. The determination can be made by the controller 204. The determination can be based, at least in part, on information provided by a user 251, by data collected from one or more sensor devices 260, and/or from stored data 1434 in the storage repository 1430. If the data is taken from a wellbore 220 within a potential low permeability geothermal resource, then the process proceeds to step 1588. If the data is not taken from a wellbore 220 within a potential low permeability geothermal resource, then the process proceeds to step 1584.

In step 1584, a determination is made as to whether the potential low permeability geothermal resource that has been identified is viable. The determination can be made by the controller 204 based on the data obtained to that point and using one or more protocols 1432 and/or algorithms 1433. The viability of the potential low permeability geothermal resource can be based on one or more of a number of factors, including but not limited to the estimated size of the potential low permeability geothermal resource, the cost to drill and complete one or more wellbores 202, the cost to set up and operate the various components (e.g., the fluid extraction system 240, the heated fluid collection system 250, the optional fluid injection system 230) of the system 200 used to produce the potential low permeability geothermal resource, the cost of alternative sources of energy weighed against the cost to produce energy by a heated fluid consumption source 275 using the heated fluid produced from the low permeability geothermal resource, available grants and tax benefits from producing the potential low permeability geothermal resource, and social goodwill in producing the potential low permeability geothermal resource versus using alternative sources of energy. If the potential low permeability geothermal resource is viable, then the process proceeds to step 1586. If the potential low permeability geothermal resource is not viable, then the process proceeds to step 1585.

In step 1585, a communication is made that the potential low permeability geothermal resource is not viable. In other words, a conclusion is made that a wellbore 220 should not be drilled in that case. The communication can be made by the controller 204 (or a component thereof, such as a communication module 1407) to one or more users 251 (in some cases, through one or more user systems 255). The communication can include the conclusion that the potential low permeability geothermal resource is not viable. The communication can also include analysis that led to the conclusion, including some or all of the various factors listed above with respect to step 1584. When step 1585 is finished, the process proceeds to the END step.

In step 1586, a communication is made that a wellbore 220 should be drilled through the potential low permeability geothermal resource. In other words, a conclusion is made that the potential low permeability geothermal resource is viable and that one or more wellbores 220 should be drilled through the low permeability geothermal resource. The communication can be made by the controller 204 (or a component thereof, such as a communication module 1407) to one or more users 251 (in some cases, through one or more user systems 255). The communication can include the conclusion that the potential low permeability geothermal resource is viable. The communication can also include analysis that led to the conclusion, including some or all of the various factors listed above with respect to step 1584.

The communication can also include other information, including but not limited to the number of wellbores 220 that should be drilled in the subterranean formation, the entry point of each wellbore 220, and the path through the subterranean formation 210 that each wellbore 220 should take. The communication can also include alternative plans for the number of placement of wellbores 220 in the subterranean formation 210. In addition, or in the alternative, the communication can have different stages or options that can be taken or vary based on information (e.g., data from one or more sensor devices 260) that is collected while a drilling operation for a wellbore 220 proceeds. In such a case, the determination as to whether a low permeability geothermal resource is viable can change based on data collected and evaluated during a field operation (e.g., drilling a wellbore 220 in the subterranean formation 210). When step 1585 is finished, the process proceeds to step 1587.

In step 1587, a determination is made as to whether a wellbore 220 has been drilled in the subterranean formation 210. In certain example embodiments, the wellbore 220 is drilled through a low permeability geothermal resource. In some cases, multiple wellbores 220 can be drilled. The determination can be made by the controller 204. The determination can be based, at least in part, on information provided by a user 251, by data collected from one or more sensor devices 260, and/or from stored data 1434 in the storage repository 1430. If a wellbore 220 has been drilled in the subterranean formation 210, then the process proceeds to step 1588. If a wellbore 220 has not been drilled in the subterranean formation 210, then the process proceeds to the END step.

In step 1588, a determination is made as to how viable the low permeability geothermal resource is. In other words, now that the low permeability geothermal resource is now actual rather than merely potential, a determination is made as to how productive the low permeability geothermal resource can be. The determination can be made by the controller 204 based on the data obtained to that point and using one or more protocols 1432 and/or algorithms 1433. Such data can include, but is not limited to, analysis of rock within the volume 290 that includes the low permeability geothermal resource and data collected from a wireline tool dropped into the wellbore 220 adjacent to the volume 290 that includes the low permeability geothermal resource. The viability of the low permeability geothermal resource can be based on a number of factors, including the factors listed above with respect to step 1584. If the low permeability geothermal resource is viable, then the process proceeds to step 1589. If the low permeability geothermal resource is not viable, then the process proceeds to step 1585.

In step 1589, the existing fractures 101 in the subterranean wellbore 210 adjacent to the wellbore 220 are evaluated. The existing fractures 101 can be evaluated by the controller 204 (or an evaluating component thereof) based on the data obtained from one or more sensor devices 260 (e.g., a wireline tool) and using one or more protocols 1432 and/or algorithms 1433. The evaluation of the existing fractures 101 can include, but is not limited to, the spacing 192 between the existing fractures 101, the length of the existing fractures 101, and the location of the existing fractures 101 within the volume 290 that includes the low permeability geothermal resource. When the evaluation of the existing fractures 101 are evaluated, the process proceeds to step 1591.

In step 1591, an induced fracture strategy is recommended. The induced fracture strategy can be recommended by the controller 204 (or a recommending component thereof) to one or more users 251, possibly using one or more user systems 255. The induced fracture strategy can include details as to where within the wellbore 220 the induced fractures 101 should be made, how (e.g., hydraulically, using electrodes, using detonations) the induced fractures 101 should be made, the force with which the induced fractures 101 should be made to result in a desired length of the induced fractures 101, the direction from the wellbore 220 that the induced fractures 101 should be made, and the distance 192 between the induced fractures 101. The recommendation can be made in any format that effectively and completely communicates the induced fracture strategy. When step 1591 is complete, the process can proceed to the END step.

In some cases, other steps can be included in this method before production of the low permeability geothermal resource begins. For example, after the induced fractures 101 are made in the volume 290 that includes the low permeability geothermal resource, an evaluation can be made as to whether additional induced fractures 101 should be made. Such an evaluation can be made by the controller 204 based on the data obtained from one or more sensor devices 260 (e.g., a wireline tool) and using one or more protocols 1432 and/or algorithms 1433.

FIG. 16 shows a flowchart 1699 of a method for operating the production of a low permeability geothermal resource according to certain example embodiments. While the various steps in this flowchart 1699 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 16 may be included in performing this method. Accordingly, the specific arrangement of steps should not be construed as limiting the scope. Further, a particular computing device, such as the computing device discussed above with respect to FIG. 5, can be used to perform one or more of the steps for the methods shown in FIG. 16 in certain example embodiments. Any of the functions performed below by the controller 404 can involve the use of one or more protocols, one or more algorithms, and/or stored data stored in a storage repository.

The method shown in FIG. 16 is merely an example that can be performed by using an example system described herein. In other words, systems for producing a low permeability geothermal resource can perform other functions using other methods in addition to and/or aside from those shown in FIG. 16. Referring to FIGS. 1A through 16, the method shown in the flowchart 1699 of FIG. 16 begins at the START step and proceeds to step 1681, where data collected during a fluid extraction segment of producing a low permeability geothermal resource is evaluated. The evaluation can be made by a controller 204 (or an evaluating component thereof), which can include the controller 1404 of FIG. 14 above, based on the data obtained from one or more sensor devices 260 and using one or more protocols 1432 and/or algorithms 1433. The fluid extraction segment can be performed by a fluid extraction system 240. The fluid extraction segment can be at the beginning of producing the low permeability geothermal resource. Alternatively, the fluid extraction segment can be starting a new cycle of a multi-cycle production of the low permeability geothermal resource.

In step 1682, a determination is made as to whether the production of the low permeability geothermal resource should transition to the heated fluid collection segment. The determination can be made by the controller 204 based on evaluating the data collected in step 1681 above. A number of factors can be considered in this determination, including but not limited to the current pressure within the wellbore 220, the temperature of the fluid being extracted from the wellbore 220, the flow rate of the fluid being extracted from the wellbore 220, and the amount of vapor phase in the fluid being extracted from the wellbore 220. If the production of the low permeability geothermal resource should transition to the heated fluid collection segment, then the process proceeds to step 1683. If the production of the low permeability geothermal resource should not transition to the heated fluid collection segment, then the process reverts to step 1682.

In step 1683, the fluid extraction system 240 is controlled to stop operating, and the heated fluid collection system 250 is controlled to operate. Control of the fluid extraction system 240 and/or the heated fluid collection system 250

(including any associated downstream systems such as the heated fluid deliver system 274 and the heated fluid consumption sources 275) can be performed by the controller 204 (or a controlling component thereof). Alternatively, the controller 204 can recommend to a user 251, whether or not through a user system 255, that the fluid extraction system 240 stop operating and/or the heated fluid collection system 250 (including any associated downstream systems such as the heated fluid deliver system 274 and the heated fluid consumption sources 275) start operating, and the user 251 can implement the control.

In step 1684, data collected during a heated fluid collection segment of producing the low permeability geothermal resource is evaluated. The evaluation can be made by the controller 204 (or an evaluating component thereof) based on the data obtained from one or more sensor devices 260 and using one or more protocols 1432 and/or algorithms 1433. The heated fluid collection segment can be performed by a heated fluid collection system 250. The heated fluid collection segment can be within one or two months of producing the low permeability geothermal resource. Alternatively, the heated fluid collection segment can be a second segment in a cycle of a multi-cycle production of the low permeability geothermal resource.

In step 1685, a determination is made as to whether the system 200 includes a fluid injection system 230. The determination can be made by the controller 204. Alternatively, the determination can be made by a user 251, whether or not through a user system 255. In some cases, a fluid injection system 230 can be part of the system 200, but a determination is made not to use the fluid injection system 230 in producing the low permeability geothermal resource. In such cases, the determination in this step 1685 to not use an existing fluid injection system 230 is the same as determining that the fluid injection system 230 is not included in the system 200. If the system 200 does not include a fluid injection system 230, or if the system 200 has a fluid injection system 230 that will not be used, then there will be no multi-cycle production of the low permeability geothermal resource. If the system 200 includes a fluid injection system 230, then the process proceeds to step 1686. If the system 200 does not include a fluid injection system 230, then the process proceeds to step 1687.

In step 1686, a determination is made as to whether the low permeability geothermal resource is depleted or about to be depleted. Put another way, a determination is made as to whether the pressure in the wellbore 220 that runs through the volume 290 that includes the low permeability geothermal resource has dropped below the minimum threshold required to allow the low permeability geothermal resource to be resaturated. The determination can be made by the controller 204 based on data obtained from one or more sensor devices 260 and using one or more protocols 1432 and/or algorithms 1433. If the low permeability geothermal resource is depleted or about to be depleted, then the process proceeds to step 1687. If the low permeability geothermal resource is not depleted or about to be depleted, then the process proceeds to step 1688.

In step 1687, the heated fluid collection system 250 is operated until the low permeability geothermal resource is depleted. The heated fluid collection system 250 (including any associated downstream systems such as the heated fluid deliver system 274 and the heated fluid consumption sources 275) can be operated by the controller 204 (or an operating component thereof). Alternatively, the heated fluid collection system 250 (including any associated downstream systems such as the heated fluid deliver system 274 and the heated fluid consumption sources 275) can be operated by a user 251, whether or not through a user system 255.

In step 1688, a determination is made as to whether the production of the low permeability geothermal resource should transition to a fluid injection segment. The determination can be made by the controller 204 based on evaluating the data collected in step 1684 above. A number of factors can be considered in this determination, including but not limited to the current pressure within the wellbore 220, the temperature of the heated fluid being collected from the wellbore 220, the flow rate of the heated fluid being collected from the wellbore 220, and the amount of liquid phase in the heated fluid being collected from the wellbore 220. If the production of the low permeability geothermal resource should transition to the fluid injection segment, then the process proceeds to step 1689. If the production of the low permeability geothermal resource should not transition to the fluid injection segment, then the process reverts to step 1684.

In step 1689, the heated fluid collection system 250 is controlled to stop operating, and the fluid injection system 230 is controlled to operate. Control of the fluid injection system 230 and/or the heated fluid collection system 250 (including any associated downstream systems such as the heated fluid deliver system 274 and the heated fluid consumption sources 275) can be performed by the controller 204 (or a controlling component thereof). Alternatively, the controller 204 can recommend to a user 251, whether or not through a user system 255, that the heated fluid collection system 250 (including any associated downstream systems such as the heated fluid deliver system 274 and the heated fluid consumption sources 275) stop operating and/or the fluid injection system 230 start operating, and the user 251 can implement the control.

In step 1691, data collected during a fluid injection segment of producing the low permeability geothermal resource is evaluated. The evaluation can be made by the controller 204 (or an evaluating component thereof) based on the data obtained from one or more sensor devices 260 and using one or more protocols 1432 and/or algorithms 1433. The fluid injection segment can be performed by a fluid injection system 230. The fluid injection segment can be the last second segment in a cycle of a multi-cycle production of the low permeability geothermal resource.

In step 1693, a determination is made as to whether the production of the low permeability geothermal resource should transition to a fluid extraction segment. The determination can be made by the controller 204 based on evaluating the data collected in step 1691 above. A number of factors can be considered in this determination, including but not limited to the current pressure within the wellbore 220, the temperature of the fluid in the wellbore 220, and the flow rate of the fluid being injected into the wellbore 220. If the production of the low permeability geothermal resource should transition to the fluid extraction segment, then the process proceeds to step 1619. If the production of the low permeability geothermal resource should not transition to the fluid injection segment, then the process reverts to step 1691.

In step 1619, the fluid injection system 230 is controlled to stop operating, and the fluid extraction system 240 is controlled to operate. Control of the fluid extraction system 240 and/or the fluid injection system 230 can be performed by the controller 204 (or a controlling component thereof). Alternatively, the controller 204 can recommend to a user 251, whether or not through a user system 255, that the fluid injection system 230 stop operating and/or the fluid extraction system 240 start operating, and the user 251 can implement the control. When step 1619 is complete, the process reverts to step 1681.

Example embodiments can be used for producing low permeability geothermal resources within subterranean formations having relatively low permeability and high porosity. Example embodiments can be used to extend the producing life of low permeability geothermal resources by periodically resaturating the rock matrix within the volume of the subterranean formation surrounding a wellbore. In some cases, fractures can be induced in the subterranean formation to optimize production of low permeability geothermal resources using example embodiments. A single wellbore can be operated to produce low permeability geothermal resources. In other words, no separate adjacent injector well is used with example embodiments. Example embodiments can also use modeling to identify low permeability geothermal resources within a subterranean formation before a wellbore has been drilled, evaluate the condition of a low permeability geothermal resource within a subterranean formation once a wellbore has been drilled therethrough, and optimize the operation of various components during the production of a low permeability geothermal resource based on factors such as, but not limited to, the viability of the low permeability geothermal resource, the use of the heated liquid produced by the low permeability geothermal resource, and the number of wellbores. Example embodiments can provide a number of benefits. Such benefits can include, but are not limited to, ease of use, use of different systems with multiple wellbores, flexibility in use of collected heated fluid, configurability, reduction in greenhouse gas, and compliance with applicable industry standards and regulations.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method for collecting a heated fluid from a fractured subterranean formation, the method comprising:
    removing, using a fluid removal system, a fluid comprising a liquid phase from the fractured subterranean formation through a wellbore that is in fluidic communication with the fractured subterranean formation, wherein fractures within the fractured subterranean formation are in fluidic communication with a low permeability rock matrix, wherein the fluid removal system is shut down when a reservoir pressure is less than a saturation pressure of the fluid, and wherein a fluid injection system and a heated fluid collection system are shut down while the fluid removal system is removing the fluid comprising the liquid phase; and
    collecting from the wellbore, using the heated fluid collection system after the fluid removal system is shut down, the heated fluid comprising a vapor phase that is expelled from the low permeability rock matrix of the fractured subterranean formation as a result of a reservoir pressure of the fractured subterranean formation falling below a saturation pressure of the fluid, wherein the fluid injection system and the fluid removal system are shut down while the heated fluid collection system is collecting the heated fluid comprising the vapor phase.

2. The method of claim 1, further comprising:
    delivering the heated fluid to a heated fluid consumption source.

3. The method of claim 1, wherein the heated fluid comprising the vapor phase comprises steam.

4. The method of claim 1, wherein the fluid comprising the liquid phase comprises native reservoir fluid, injection fluid, hydraulic fracturing fluid, or any combination thereof.

5. The method of claim 1, further comprising:
    collecting, using the heated fluid collection system, a second heated fluid comprising the vapor phase from the fractured subterranean formation through a second wellbore.

6. The method of claim 1, further comprising:
    injecting, using a fluid injection system after the heated fluid collection system is shut down, an injection fluid comprising the liquid phase into the low permeability rock matrix of the fractured subterranean formation through the wellbore when a parameter falls outside a range of acceptable values, wherein the fluid removal system and the heated fluid collection system are shut down while the fluid injection system is injecting the injection fluid comprising the liquid phase.

7. The method of claim 6, wherein the injection system begins injecting the injection fluid when a minimum reservoir pressure is exceeded.

8. The method of claim 6, wherein the low permeability rock matrix within the fractured subterranean formation has a capillary pressure sufficient for the low permeability rock matrix to imbibe the injection fluid while the fluid injection system is injecting the injection fluid comprising the liquid phase.

9. The method of claim 6, wherein the fluid comprising the liquid phase or the injection fluid comprising the liquid phase within the low permeability rock matrix transitions to the heated fluid comprising the vapor phase that is expelled from the low permeability rock matrix.

10. The method of claim 6, wherein the parameter comprises a pressure within the wellbore.

11. The method of claim 6, wherein the process of removing the fluid comprising the liquid phase, collecting the heated fluid comprising the vapor phase, and injecting the injection fluid comprising the liquid phase is repeated cyclically.

12. The method of claim 6, wherein the fluid injection system stops injecting the injection fluid when
    the injection fluid comprising the liquid phase saturates the low permeability rock matrix of the fractured subterranean formation.

13. The method of claim 6, wherein the injection fluid injected into the wellbore is imbibed into the low permeability rock matrix assisted by capillary pressure effects.

14. The method of claim 6, further comprising:
    removing, using the fluid removal system and after the fluid injection system is shut down, the fluid comprising the liquid phase from the fractured subterranean formation through the wellbore, wherein the fluid removal system is shut down when the reservoir pressure is less than the saturation pressure of the fluid, and wherein the fluid injection system and the heated fluid collection system are shut down while the fluid removal system is removing the fluid comprising the liquid phase; and collecting from the wellbore, using the heated fluid collection system and after the fluid removal system is shut down, the heated fluid comprising the vapor phase that is expelled from the low permeability rock matrix of the fractured subterranean formation as a result of a reservoir pressure of the fractured subterranean formation falling below the saturation pressure of the fluid, and wherein the fluid injection system and the fluid removal system are shut down while the heated fluid collection system is collecting the heated fluid comprising the vapor phase.

15. The method of claim 6, further comprising:

injecting, using the fluid injection system, a second injection fluid comprising the liquid phase into the low permeability rock matrix of the fractured subterranean formation through a second wellbore.

16. The method of claim 15, wherein there is underground hydraulic communication between the wellbore and the second wellbore, and wherein the fluid injection system injects the second injection fluid comprising the liquid phase into the second wellbore while the fluid injection system is injecting the injection fluid comprising the liquid phase into the wellbore.

17. The method of claim 15, wherein there is no underground hydraulic communication between the wellbore and the second wellbore, and wherein the fluid injection system injects the second injection fluid comprising the liquid phase into the second wellbore while the heated fluid collection system is collecting the heated fluid comprising the vapor phase from the wellbore or while the heated fluid collection system is collecting the heated fluid comprising the vapor phase from the wellbore.

18. The method of claim 1, wherein the heated fluid collection system is configured to deliver the fluid comprising the vapor phase to a heated fluid delivery system.

19. The method of claim 18, wherein the heated fluid delivery system is configured to deliver the fluid comprising the vapor phase to a heated fluid consumption source for use of the fluid comprising the vapor phase.

20. The method of claim 19, wherein the heated fluid consumption source comprises an electric generator that is configured to use the fluid comprising the vapor phase to flow through a turbine in order to generate electrical power.

* * * * *